US012607282B2

(12) United States Patent
Müller et al.

(10) Patent No.: US 12,607,282 B2
(45) Date of Patent: Apr. 21, 2026

(54) PIPE CONNECTOR FOR TIGHTLY CONNECTING TWO PIPE ENDS, USE THEREOF AND METHOD

(71) Applicant: Viega Technology GmbH & Co. KG, Attendorn (DE)

(72) Inventors: Andreas Müller, Freudenberg (DE); Klaus Schröder, Attendorn (DE); Nadine Riili, Lennestadt (DE); Karsten Bohr, Attendorn (DE); Natascha Kaufmann, Attendorn (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 18/797,630

(22) Filed: Aug. 8, 2024

(65) Prior Publication Data

US 2025/0052346 A1     Feb. 13, 2025

(30) Foreign Application Priority Data

Aug. 9, 2023     (DE) ...................... 10 2023 121 238.9

(51) Int. Cl.
F16L 21/08 (2006.01)
F16L 37/091 (2006.01)

(52) U.S. Cl.
CPC ............. F16L 21/08 (2013.01); F16L 37/091 (2013.01)

(58) Field of Classification Search
CPC ....... F16L 13/14; F16L 13/141; F16L 13/142; F16L 13/146; F16L 13/16; F16L 13/161; F16L 13/165; F16L 2013/145; F16L 47/12; F16L 47/06; F16L 19/0206; F16L 19/0212; F16L 19/028; F16L 19/0283; F16L 19/08; F16L 19/045; F16L 19/10; F16L 19/103; F16L 25/12; F16L 21/08; F16L 37/091;
(Continued)

(56) References Cited

U.S. PATENT DOCUMENTS 8,651,532  B2      2/2014  Felber
2007/0296213  A1*  12/2007  Jones ..................... F16L 55/172
                                                  285/104
(Continued)

FOREIGN PATENT DOCUMENTS

DE      102007061288 A1      6/2009
DE      102011112050 A1      3/2013
DE      102016103546 A1      8/2017

*Primary Examiner* — Aaron M Dunwoody
(74) *Attorney, Agent, or Firm* — The Webb Law Firm

(57)      ABSTRACT

The invention relates to a pipe connector for tightly connecting a first pipe end to a second pipe end, with a sleeve-like base body which has a first receptacle for inserting a first pipe end and a second receptacle for inserting a second pipe end, with first retaining elements in the area of the first receptacle, which are designed to fixate a first pipe end inserted into the first receptacle in the first receptacle after the pipe connector has been pressed, and with second retaining elements in the area of the second receptacle, which are designed to fixate a second pipe end inserted into the first receptacle after the pipe connector has been pressed, wherein the base body is formed from a plurality of base body segments arranged next to one another in the circumferential direction. The invention further relates to a use of the pipe connector and to a method for tightly connecting a first pipe end to a second pipe end.

16 Claims, 15 Drawing Sheets

(58) Field of Classification Search
CPC ... F16L 55/17; F16L 55/1705; F16L 55/1715;
F16L 55/172
See application file for complete search history.

(56) References Cited

U.S. PATENT DOCUMENTS

| | | |
|---|---|---|
| 2010/0253076 A1 | 10/2010 | Beard et al. |
| 2013/0093184 A1 | 4/2013 | Peirce |
| 2015/0115604 A1 | 4/2015 | Delmar et al. |

* cited by examiner

PIPE CONNECTOR FOR TIGHTLY CONNECTING TWO PIPE ENDS, USE THEREOF AND METHOD

CROSS-REFERENCE TO RELATED APPLICATION

This application claims priority to German Patent Application No. 10 2023 121 238.9 filed Aug. 9, 2023, the disclosure of which is hereby incorporated by reference in its entirety.

BACKGROUND OF THE INVENTION

Field of the Invention

The present invention relates to a pipe connector for tightly connecting a first pipe end to a second pipe end, having a sleeve-like base body, which has a first receptacle for inserting a first pipe end and a second receptacle for inserting a second pipe end, having first retaining elements in the area of the first receptacle, which are designed to fixate a first pipe end inserted into the first receptacle in the first receptacle after the pipe connector has been pressed, and with second retaining elements in the area of the second receptacle, which are designed to fixate a second pipe end inserted into the second receptacle in the second receptacle after the pipe connector has been pressed. The present invention further relates to a use of the pipe connector and to a method for tightly connecting a first pipe end to a second pipe end.

Description of Related Art

Various pipe connectors are known from the state of the art for connecting plastic pipes, in particular underground supply lines, such as municipal drinking water or gas supply lines.

Pipe connectors with integrated electrofusion coils, which are materially bonded to the pipe ends by electrofusion welding, are known, for example. Such pipe connectors enable long-lasting, tight connections. However, the production of the materially bonded connection requires very long welding and cooling times, which leads to high installation costs.

Pipe connectors in the form of press connectors that are pressed with the pipe ends using a pressing tool are also known, for example from DE 10 2016 103 546 A1.

Pipe connectors designed as plug connectors are also known, which have, for example, a ring element with spring-loaded retaining teeth arranged in a sleeve, which retaining teeth fixate a pipe end inserted into the sleeve through the ring element.

To ensure reliable tightness of the press connections, the press connections must also be able to withstand radial and axial forces.

Known press connectors usually transmit radial and axial forces via a sleeve-like housing component, which forms the outer shell of the press connector. The transmission of axial forces in particular usually requires quite large wall thicknesses for this component in order to ensure sufficient compressive and tensile strength and to fulfil standardized regulations, for example to keep the component stresses within the permitted range. This applies in particular to press connectors made of non-metallic materials, especially plastic. At the same time, however, plastic components with large wall thicknesses are almost impossible or very difficult to cold form plastically, which would make cold forming using a pressing tool, as is known for metallic press connectors for pipes, for example, very complex. In addition, press connectors with large wall thicknesses cannot typically be manufactured by injection molding due to the low tolerances and can only be produced using complex machining processes.

Pipe connectors with internal support bodies are also known, for example from DE 10 2011 112 050 A1. Pipe connectors of this type generally enable reliable and durable pipe connections, but in some cases place higher demands on the calibration of the pipe ends in order to be able to insert the pipe ends between the inner support body and the pipe connector housing. In addition, inserting a pipe end into a pipe connector of this type can be more difficult than with pipe connectors without internal support bodies, particularly in confined spaces, for example during underground installation work. Axial tensile forces occurring in the pipe connector from DE 10 2011 112 050 A1 are also essentially transmitted via the housing of the pipe connector, which, as explained above, requires greater wall thicknesses, making cold forming more difficult.

SUMMARY OF THE INVENTION

Against this background, the present invention is based on the object of providing a pipe connector for tightly connecting two pipe ends, in particular of two plastic pipes, which is easy to install, in particular on underground supply lines, and enables a reliable and durable tight connection.

Preferably, the pipe connector should enable a fast and secure connection technique, particularly preferably with economical use of materials and with an easily manageable weight and size. Furthermore, the pipe connector should preferably be cold processable, in particular able to be pressed, and robust against construction site conditions, in particular when laid underground.

The aforementioned object is solved in accordance with the invention by a pipe connector for tightly connecting a first pipe end to a second pipe end, with a sleeve-like base body, which has a first receptacle for inserting a first pipe end and a second receptacle for inserting a second pipe end, with first retaining elements in the area of the first receptacle, which are designed to fixate a first pipe end inserted into the first receptacle in the first receptacle after the pipe connector has been pressed, and with second retaining elements in the area of the second receptacle, which are designed to fixate a second pipe end introduced into the second receptacle in the second receptacle after the pipe connector has been pressed, wherein the base body is formed from a plurality of basic body segments arranged next to one another in the circumferential direction. In this way, a pipe connector is provided that can be easily installed by pressing and enables a long-lasting, tight pipe connection.

Such a segmented structure of the base body can, in particular, achieve a more even distribution of force during pressing, so that the inner diameter of the base body gets smaller evenly during pressing and the first and second retaining elements embed into the outer surfaces of the first and second pipe ends more evenly, in particular more evenly over the circumference. In particular, a homogeneous embedding of the first and/or second retaining elements over the circumference of the first and/or second pipe end can be achieved in this way, whereby a uniform and straight assembly is achieved.

For uniform pressing over the circumference, the base body is preferably formed from at least four, more preferably at least six, particularly preferably at least eight base body segments arranged next to each other in the circumferential direction. With N base body segments, each base body segment preferably forms the Nth part of the circumference of the sleeve-like base body. In particular, a base body segment comprises a first section which, together with the other base body segments, surrounds the first receptacle, and a second section which, together with the other base body segments, surrounds the second receptacle.

Preferably, the base body is formed from essentially identical base body segments. In this way, the manufacturing costs can be reduced.

The base body segments are preferably designed as individual elements, i.e. they are not materially connected to each other. In this way, the elements can be manufactured separately from each other and then assembled to form the base body. In particular, individual base body segments can be produced more easily and more quickly, for example by injection molding, than a one-piece sleeve.

It is also conceivable that the same shape of base body segments can be used for different nominal diameters by using different numbers of base body segments for base bodies of different nominal diameters. In this way, production and/or storage costs can be reduced.

The base body segments are preferably designed and arranged in relation to each other in such a way that in the unpressed state there are gaps between the base body segments, which are partially or completely closed during pressing. This facilitates the pressing of the base body segments.

The base body segments can be connected to each other in a form-fit and/or force-fit manner, for example by means of tongue and groove connections and/or snap-in connections. In this way, the correct positioning and/or alignment of the base body segments to each other can be supported, especially in the unpressed state. The base body segments or some of the base body segments may also be unconnected to one another. The base body is therefore preferably made up of several, in particular individual, base body segments. The plurality of these base body segments then in sum results in the outer surface of the base body.

It is also conceivable that some of the base body segments, for example two or more base body segments arranged next to each other, or even all base body segments are connected to each other materially, for example by means of webs or film hinges, or by material bonding, for example by means of adhesive points. In this way, the correct positioning and/or alignment of the base body segments in relation to each other can be supported, particularly in the unpressed state.

If several of the base body segments are connected to one another materially and/or by material bonding, the material and/or material bonding connection of these base body segments to one another preferably has a smaller, in particular significantly smaller, wall thickness than the base body segments themselves, preferably a wall thickness of less than 3 mm, in particular less than 1 mm. In this way, the material and/or material-bonding connections do not hinder the pressing process. In addition, there are also preferably gaps between the base body segments that are connected to each other materially and/or by material bonding in the unpressed state, which gaps are partially or completely closed during pressing.

The pipe connector is used to tightly connect a first pipe end to a second pipe end. In particular, the pipe ends may be pipe ends of pipes made of a flexible material, especially plastic. Preferably, the pipe connector is designed for plastic pipes for underground supply lines, in particular underground gas or drinking water supply lines.

The pipe connector is connected to the first and second pipe ends by pressing, in particular using a pressing tool. The pipe connector is therefore a press connector that is designed to be pressed with a first pipe end inserted into the first receptacle and with a second pipe end inserted into the second receptacle in order to tightly connect a first pipe end to a second pipe end.

Pressing is carried out in particular by cold forming the base body. Compared to hinged press connectors, in which two or more housing segments connected by hinges are swiveled towards each other during pressing without any significant cold forming of the housing segments, the cold forming of the base body allows a more uniform radial pressing force to be exerted on the retaining elements and/or the pipe ends in the circumferential direction, so that a stable and tight connection can be achieved between the pipe connector and the pipe end, in particular also without an internal support body.

The pipe connector therefore preferably effects a fixation and a sealing of the first and second pipe ends from the outside, in particular without an internal support body. Accordingly, the pipe connector preferably has no internal support body.

The pipe connector is particularly advantageous for larger pipe cross-sections, as these are frequently used for underground installation and the advantage of the pipe connector, i.e. simpler pressing due to the segmented base body, also comes into play with larger pipe cross-sections and/or greater wall thicknesses, particularly with pipe connectors for larger pipe cross-sections. The pipe connector is therefore preferably designed for the tight connection of pipe ends of pipes with an outer diameter of d25 (outer diameter of 25 mm) or more, for example d25-225 (outer diameter of 25-225 mm), in particular d32 (outer diameter of 32 mm) or more, for example d32-225 (outer diameter of 32-225 mm).

The pipe connector has a base body. The base body can be made in one or more parts. Preferably, the base body is made of plastic. In this way, a pipe connector with low material costs and low weight can be provided.

The base body is sleeve-like and has a first receptacle for inserting a first pipe end and a second receptacle for inserting a second pipe end. The first and second receptacles are preferably opposite each other, so that the first and second pipe ends can be inserted into the respective first and second receptacles of the base body from opposite sides of the base body. The first and second receptacles, with an optional transition area arranged therebetween, form a continuous channel through the base body, so that the first and second pipe ends can be connected to one another by the pipe connector in a fluid-conducting manner. The first and second receptacles may be designed in such a way that the first and second pipe ends abut against each other once they have been inserted. Furthermore, also one or more stop surfaces may be provided in the base body, against which a respective pipe end inserted into the first and/or second receptacle comes to rest, so that the first and second pipe ends are spaced apart from one another after their insertion into the respective receptacle, in particular have a spacing from one another predetermined by the one or more stop surfaces.

The pipe connector has first retaining elements in the area of the first receptacle, which are designed to fixate a first pipe end inserted into the first receptacle in the first receptacle after the pipe connector has been pressed. The first retaining elements may, for example, be designed, on the pipe connector, in the form of one or more cutting edges, for example in the form of cutting teeth, which are embedded into the outer surface of the first pipe end when the pipe connector is pressed and in this way fixate the first pipe end in the first receptacle with a form fit.

The pipe connector further has second retaining elements in the area of the second receptacle, which are designed to fixate a second pipe end inserted into the second receptacle in the first receptacle after the pipe connector has been pressed. The second retaining elements may, for example, be designed, on the pipe connector, in the form of one or more cutting edges, for example in the form of cutting teeth, which are embedded into the outer surface of the second pipe end when the pipe connector is pressed and in this way fixate the second pipe end in the second receptacle with a form fit.

Accordingly, the first and second retaining elements are preferably designed to fixate in a form-fitting manner the first and second pipe ends in the respective receptacle after pressing.

The aforementioned object is further solved according to the invention by the use of the pipe connector described above or an embodiment thereof for connecting a first pipe end and a second pipe end, in particular of pipes made of flexible material, preferably plastic pipes.

As described above, the pipe connector is particularly suitable for tightly connecting underground supply lines, such as underground gas or drinking water supply lines. Accordingly, the pipes are preferably plastic pipes for underground gas or drinking water supply lines.

As also described above, the pipe connector is particularly suitable for larger pipe cross-sections. Accordingly, the pipes are preferably pipes with an outer diameter of d25 (outer diameter of 25 mm) or more, for example d25-225 (outer diameter of 25-225 mm), in particular d32 (outer diameter of 32 mm) or more, for example d32-225 (outer diameter of 32-225 mm).

The aforementioned object is further solved according to the invention by a method for tightly connecting a first pipe end to a second pipe end, in which a first pipe end is inserted into the first receptacle of the pipe connector described above or an embodiment thereof, in which a second pipe end is inserted into the second receptacle of the pipe connector and in which the pipe connector is pressed in such a way that the first pipe end is fixated in the first receptacle by the first retaining elements, in particular in a form-fit manner, and the second pipe end is fixated in the second receptacle by the second retaining elements, in particular in a form-fit manner.

The pipe connector is preferably pressed using a pressing tool. During pressing, the base body is preferably cold-formed so that the first retaining elements are embedded into the outer surface of the first pipe end and the second retaining elements are embedded into the outer surface of the second pipe end.

The pipe connector can be pressed in the area of the first receptacle and in the area of the second receptacle at the same time. It is also conceivable that the pipe connector is first pressed in the area of one receptacle, for example the first receptacle, and then in the area of the other receptacle, for example the second receptacle.

Various embodiments of the pipe connector, the use and the method are described below, whereby the individual embodiments each apply independently of one another to the pipe connector, the use and the method. In addition, the individual embodiments can be combined with one another as desired.

In one embodiment, one or more bridge retaining elements are provided, wherein a bridge retaining element extends in each case from the area of the first receptacle to the area of the second receptacle and forms at least one of the first retaining elements and at least one of the second retaining elements. In this way, a pipe connector is provided which can be easily installed by crimping and enables a long-lasting, tight pipe connection even when radial and/or axial forces occur.

With the one or more bridge retaining elements, which each extend from the area of the first receptacle to the area of the second receptacle and form at least one of the first retaining elements and at least one of the second retaining elements, separate components can in particular be provided in the pipe connector, which span both pipe ends, in other words the two joining partners, and can absorb the axial forces occurring via the first and second retaining elements of the respective bridge retaining element and transmit them from one pipe end to the other pipe end without causing leaks in the pipe connection. Because the axial forces are transmitted via the one or more bridge retaining elements, these forces do not have to be absorbed and transmitted by the base body, so that this in turn can be realized with smaller wall thicknesses. In this way, a functional separation is achieved between the protection against axial forces by the bridge retaining elements and the structural integrity of the press connector by the base body, in particular also as burst protection radially outwards against the internal pressure of the medium flowing through the pipe ends. This makes it possible to provide a pipe connector with lower material consumption, a slimmer design and therefore less space requirement.

This is particularly advantageous for larger pipe cross-sections, where the advantage of being able to select a smaller wall thickness for the base body is particularly beneficial. The pipe connector is therefore preferably designed for the tight connection of pipe ends of pipes with an outer diameter of d25 (outer diameter of 25 mm) or more, for example d25-225 (outer diameter of 25-225 mm), in particular d32 (outer diameter of 32 mm) or more, for example d32-225 (outer diameter of 32-225 mm).

The lower wall thickness required for the base body also allows the base body to be manufactured more cost-effectively, for example by injection molding. Furthermore, the lower wall thicknesses required reduce the cooling time during the production of the base body.

The one or more bridge retaining elements are preferably made of a different material than the base body, for example a different plastic or metal. A material suitable for the transmission of axial forces may in particular be selected for the one or more bridge retaining elements, while a material suitable for cold forming during pressing may in particular be selected for the base body.

In the pressed state, the segmented structure of the base body further promotes force transmission via the first or second retaining elements into the bridge retaining elements, so that axial forces are transmitted from one pipe end via the corresponding retaining element to the bridge retaining elements and from this via the respective other retaining element to the respective other pipe end.

In the pipe connector of the embodiment described above, one or more bridge retaining elements are provided, wherein a bridge retaining element extends in each case from the area of the first receptacle to the area of the second receptacle and forms at least one of the first retaining elements and at least one of the second retaining elements.

Such a bridge retaining element therefore forms both a first retaining element for fixating the first pipe end in the first receptacle and a second retaining element for fixating the second pipe end in the second receptacle. For this purpose, the bridge retaining element extends from the area of the first receptacle to the area of the second receptacle and thus spans the first and second pipe ends, so that axial forces, in particular axial tensile forces, are transmitted from one pipe end to the other via the bridge retaining element.

Accordingly, the bridge retaining element extends from the area of the first receptacle to the area of the second receptacle in particular in a tensile force transmitting manner. For this purpose, the bridge retaining element is preferably designed in one piece. The bridge retaining element can also be designed in several parts if the bridge retaining element parts from which the multi-part bridge retaining element is formed are connected to one another in such a way that the bridge retaining element can transmit tensile forces from the first to the second retaining elements of the bridge retaining element and/or vice versa.

Preferably, several, for example at least four or at least six, bridge retaining elements are provided, which are preferably distributed around the inner circumference of the base body. In this way, axial force transmission may be evenly distributed over the circumference of the pipe connector so that shear forces are reduced.

In addition to the one or preferably several bridge retaining elements, the pipe connector may optionally also have additional first and/or second retaining elements that are not assigned to any bridge retaining element.

In one embodiment, one or more of the base body segments have alignment means to align adjacent base body segments with respect to one another, in particular in the unpressed state. In this way, the base body segments are held in a defined position in relation to each other. This also makes it easier to assemble the pipe connector during production.

The base body segments may, for example, have corresponding tongue and groove connecting means, so that the tongue of a base body segment engages in the corresponding groove of an adjacent base body segment, particularly in the unpressed state.

In one embodiment, one or more of the base body segments have one or more receptacles for a respective bridge retaining element. In this way, the individual bridge retaining elements may be securely positioned at their respective circumferential position, which improves the robustness of the pipe connector in the event of forces occurring in the circumferential direction.

The base body segments and/or the bridge retaining elements may have latching means to fixate a bridge retaining element in the respective receptacle. In this way, unwanted loosening of the bridge retaining elements in the unpressed state can be prevented.

A base body segment may have one receptacle or several, for example two, receptacles arranged next to each other in the circumferential direction.

The base body segments therefore preferably accommodate the respective bridge retaining elements with the first and second retaining elements.

In one embodiment, the pipe connector has a, preferably sleeve-like, housing which at least partially surrounds the base body, wherein the housing has a first housing opening for inserting a first pipe end into the first receptacle and a second housing opening for inserting a second pipe end into the second receptacle. Preferably, the housing is arranged in a shell-like manner around the base body.

The housing can absorb radial forces and thus improve the burst protection of the pipe connector. Furthermore, the housing can fixate the base body in the pressed state, thereby preventing the pipe connector from coming loose from the pressed state.

If the base body consists of several base body segments, the housing can also ensure the correct alignment of the base body segments, especially in the unpressed state.

In particular, the housing may have several housing parts, in particular several housing parts arranged axially to one another in relation to the sleeve-shaped base body.

As described above, the base body is formed from several base body segments. The base body segments are preferably fixed in place by the housing parts, whereby the housing parts are preferably pushed onto the base body segments from the outside in the shape of a shell.

In the unpressed state, the housing parts or sections thereof preferably have a distance from one another, particularly axially, which is reduced when the pipe connector is pressed. In this way, the housing can fixate the pipe connector in the pressed state.

The housing may be made of metal or, preferably, plastic. In particular, the housing parts may be manufactured by injection molding, preferably with reinforcing insert elements, for example metal rings, to reinforce the burst protection provided by the housing and/or to transmit the pressing force to the base body.

In one embodiment, the housing has a plurality of housing parts which have sliding surfaces corresponding to respective pressing surfaces of the base body, so that an axial pressing force exerted on the housing parts by means of a pressing tool causes a radial pressing force on the base body. In this way, an axial pressing force exerted on the housing can be at least partially converted into a radial pressing force, by which the base body is pressed radially inwards, so that the retaining elements, in particular the retaining elements of the optionally provided bridge retaining elements, are embedded into the outer surface of the respective pipe ends.

Preferably, the housing has a first and a second housing part, with the first housing part being arranged in the area of the first receptacle and the second housing part being arranged in the area of the second receptacle.

The pressing surfaces of the base body and the corresponding sliding surfaces of the housing parts are preferably aligned at an angle to the axial axis of the base body. For example, the base body may form a respective frustoconical pressing surface in the area of the first and/or second receptacle, which may be formed, for example, from respective partial pressing surfaces of the individual base body segments. The housing may accordingly have a first and second housing part with a respective sliding surface corresponding to the respective frustoconical pressing surface. In this way, a uniform force distribution of the radial pressing force in the circumferential direction is achieved during pressing.

As explained above, the base body is formed from several base body segments. By axially displacing the housing parts with a pressing tool, whereby the two housing parts are moved towards each other along the axis of the pipe connector, the base body segments are then moved towards each other along the axis of the pipe connector (or the pipe ends, respectively) and the cross-section is being reduced via the inclined and displaceable sliding and pressing surfaces so that the individual retaining elements, in particular the retaining elements of the optionally provided bridge retaining elements, and the preferably provided sealing element are applied radially to the respective pipe ends.

In one embodiment, the housing parts among each other have corresponding latching means in order to latch the housing parts together in the pressed state, in particular in a pressed position. Additionally or alternatively, the housing parts and the base body may have latching means corresponding to each other in order to latch the housing parts in the pressed state, in particular in a pressed position. In this way, unintentional movement of the housing parts out of the pressed position can be prevented. As a result, the housing can also reliably fixate the base body in the pressed state.

The housing parts may, for example, have corresponding latching hooks and latching undercuts in order to latch the housing parts together in the pressed position when the pipe connector is pressed.

Additionally or alternatively, the housing parts may also have corresponding latching means in order to latch the housing parts together in the unpressed state of the pipe connector, in particular to hold them in an initial position relative to one another. Additionally or alternatively, the housing parts and the base body may have corresponding latching means in order to latch the housing parts together in the unpressed state, in particular to hold them in an initial position relative to one another. In this way, unwanted detachment of the housing parts from the rest of the pipe connector in the unpressed state can be prevented.

The base body segments may preferably be fixed in place by the housing parts by sliding the housing parts over the base body segments from the outside, preferably in the shape of a shell, until they engage in an initial position.

In one embodiment, a pressed marking is provided which indicates the pressed state of the pipe connector. The pressed marking may, for example, be a colored marking on one of the housing parts in the area of the corresponding latching means, which is visible from the outside in the unpressed state and not visible from the outside in the pressed state, preferably covered by the other housing part, in particular its latching means.

In one embodiment, the one or more bridge retaining elements have a higher tensile strength and/or higher yield strength than the base body. In this way, the bridge retaining elements can better absorb tensile forces and have lower wall thicknesses.

In particular, the bridge retaining elements may consist of a metal or a composite material, for example fiber-reinforced plastic.

Tensile strength is understood to mean the tensile strength $R_m$, measured according to ISO 6892 for metallic materials and ISO 527 for plastics and composite materials. The yield strength is understood to be the yield strength, in particular $R_{p0,2}$, measured according to ISO 6892 for metallic materials and according to ISO 527 for plastics and composite materials.

In one embodiment, the one or more bridge retaining elements are formed in one piece. In this way, the axial forces can be transmitted particularly well.

In one embodiment, the one or more bridge retaining elements have respective cutting edges, for example in the form of cutting teeth, as first and second retaining elements. During pressing, the cutting edges are embedded into the outer surface of the respective pipe end and thus securely fixate the pipe end in the respective receptacle.

The cutting surface of the cutting edges pointing towards the axial center of the pipe connector preferably has a steeper angle to the axial axis than the cutting surface pointing away from the axial center of the pipe connector. Such an asymmetrical cutting edge can achieve an increased required pull-out force in the direction out of the respective holder, while the cutting edges can simultaneously be designed with a wider base and therefore more robust.

In one embodiment, the pipe connector has a preferably sleeve-shaped sealing element that extends between the first retaining elements and the second retaining elements from the area of the first receptacle to the area of the second receptacle. The sealing element is preferably arranged further inwards in the radial direction of the base body than the one or more optionally provided bridge retaining elements. In this way, the transition from the first pipe end to the second pipe end can be sealed in a liquid- and/or gas-tight manner in the pressed state, so that a tight pipe connection is achieved.

The sealing element is preferably made of an elastomer.

As described above, the base body is made up of several base body segments, whereby the plurality of these base body segments in sum forms the outer surface of the base body. The sealing element is preferably arranged on the inside of the shell surface formed by the base body segments, preferably further inside than the optionally provided bridge retaining elements, which are preferably supported by the base body segments. In particular, the sealing element may abut on the inside of the optionally provided bridge retaining elements.

The sealing element preferably has sealing lips in the area of the first receptacle and/or the second receptacle. In this way, a better seal to the first or second pipe end can be achieved.

BRIEF DESCRIPTION OF THE DRAWINGS

Further features and advantages of the pipe connector, the use and the method are shown in the following description of embodiments, with reference being made to the attached drawings.

In the drawings

DESCRIPTION OF THE INVENTION

Figure 1A:
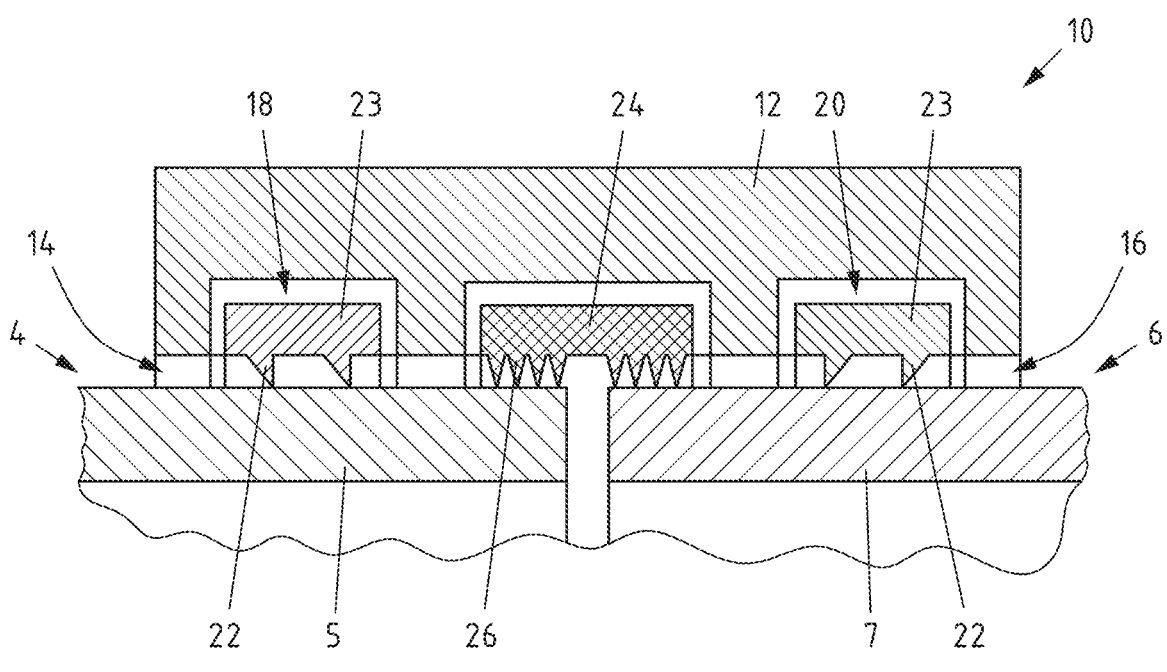
FIG. 1*a-b* show a pipe connector in the unpressed and pressed state.
Figure 1B:
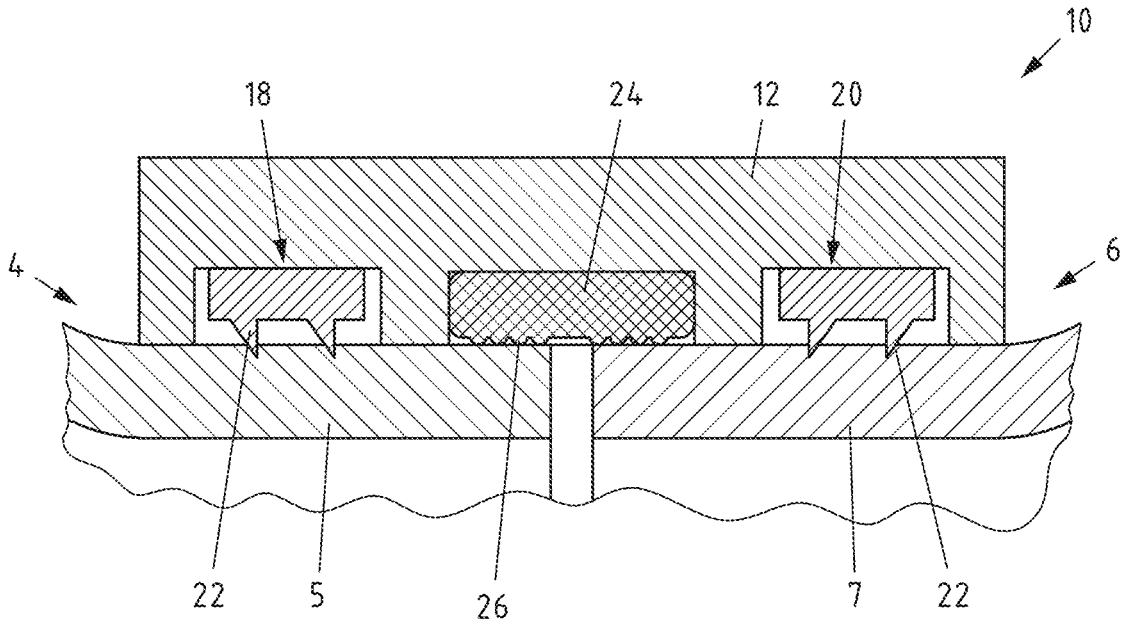

FIGS. 1*a-b* show a schematic cross-sectional partial view of a pipe connector 10 designed as a press connector for connecting two pipe ends 4, 6 of two pipes 5, 7 from the prior art. FIG. 1*a* shows the pipe connector 10 in the unpressed state and FIG. 1*b* shows the pipe connector 10 in the pressed state.

The pipe connector 10 has a sleeve-shaped base body 12 with a first receptacle 14 for the first pipe end 4 and a second receptacle 16 for the second pipe end 6. In the first and second receptacles 14, 16, respective retaining elements 18, 20 are arranged in the form of metal rings 23 provided with cutting edges 22, wherein the cutting edges 22 are embedded into the respective outer surface of the pipe ends 4, 6 when the pipe connector 10 is pressed with the pipe ends 4, 6 (see FIG. 1*b*) and in this way fixate the pipe ends 4, 6 in the receptacles 14, 16.

The pipe connector also has a sealing element 24 with sealing lips 26 to seal the transition from the first pipe end 4 to the second pipe end 6.

If axial forces act on the pipe connector 10 via one of the pipe ends 4, 6 in the pressed state (FIG. 1b), these must be absorbed by the base body 12 in order to be transferred to the respective other pipe end. In order for the base body 12 to be able to absorb the forces that typically occur during underground installation, for example, it must be designed with a relatively thick wall thickness. In addition to the high amount of material required for the base body 12, this means in particular that very high pressing forces are required to press the base body 12 with the large wall thickness. For this reason, a pipe connector as shown in FIG. 1a-b is not particularly suitable for large pipe cross-sections or for installation situations with potentially high axial forces.

Figure 2A:
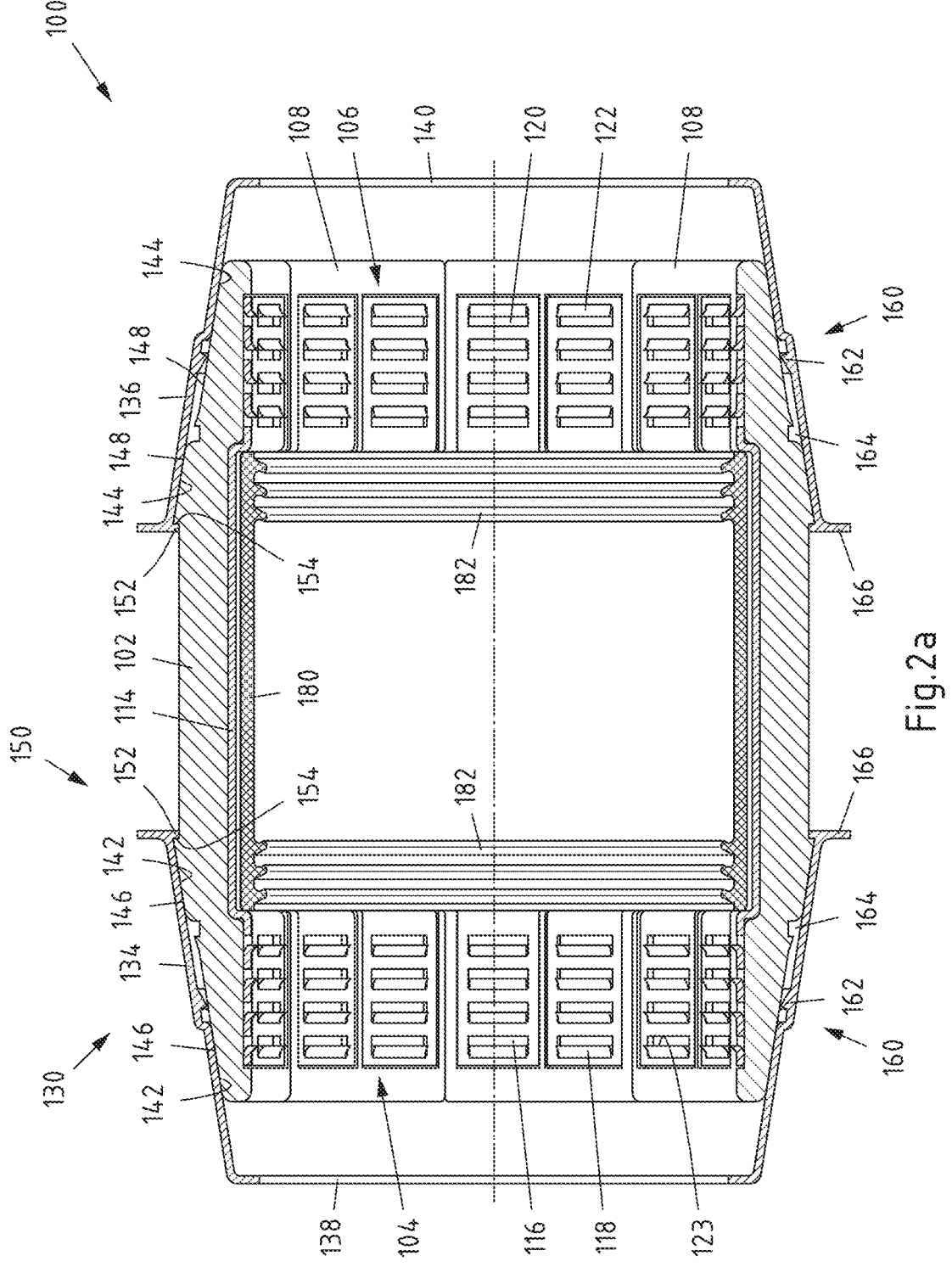
FIG. 2*a-e* show a first exemplary embodiment of the pipe connector in various views and its use.
Figure 2B:
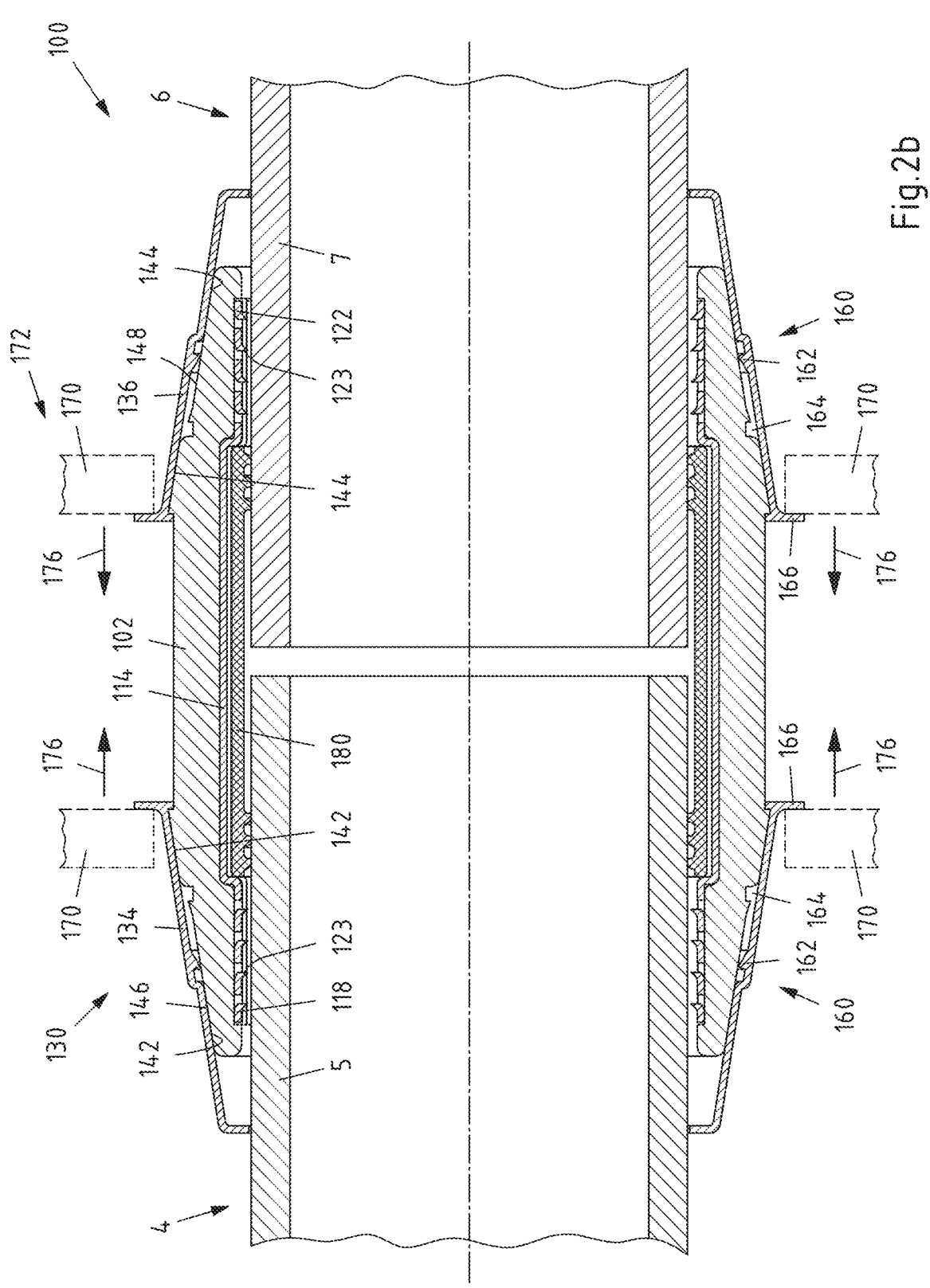
Figure 2C:
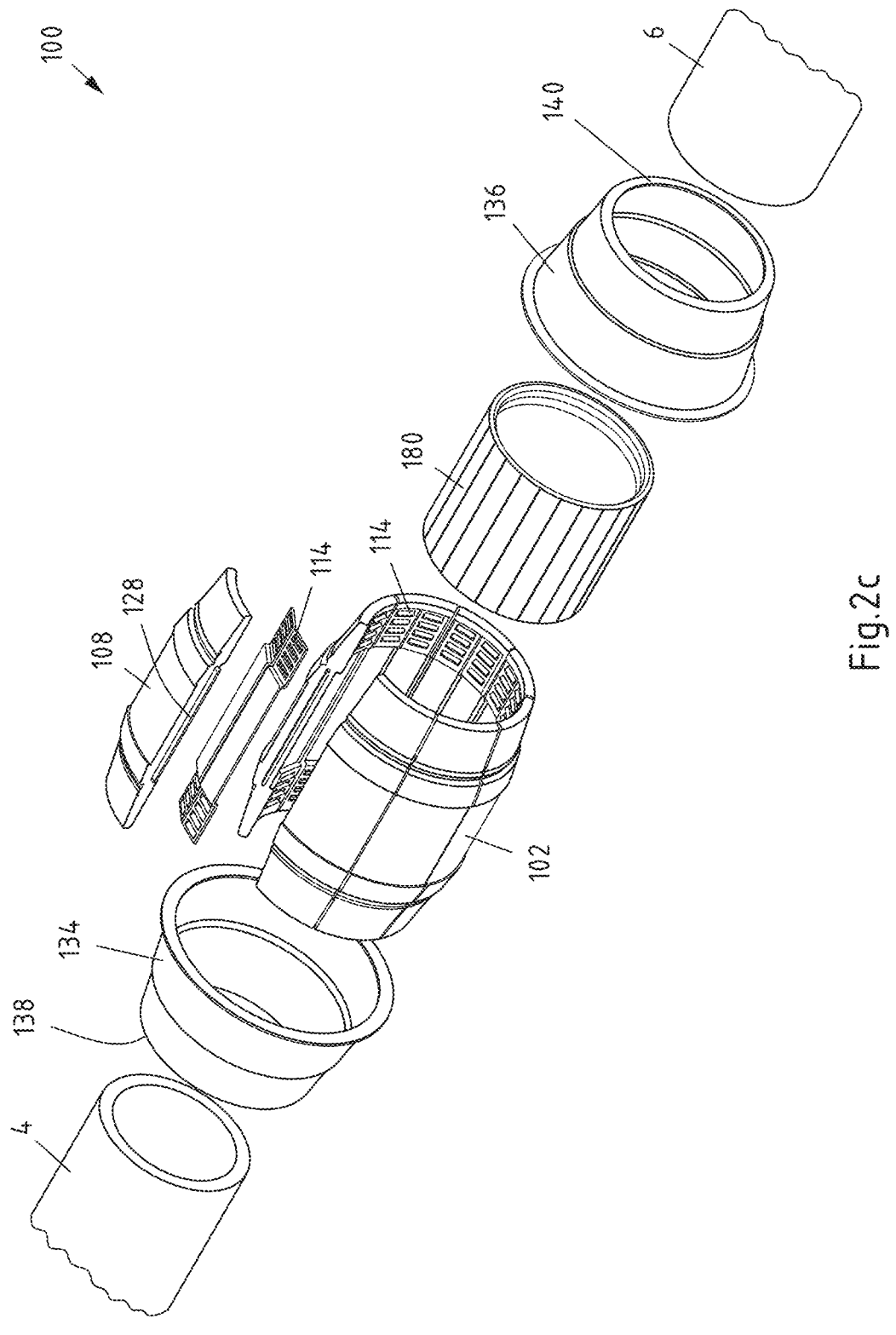
Figure 2D:
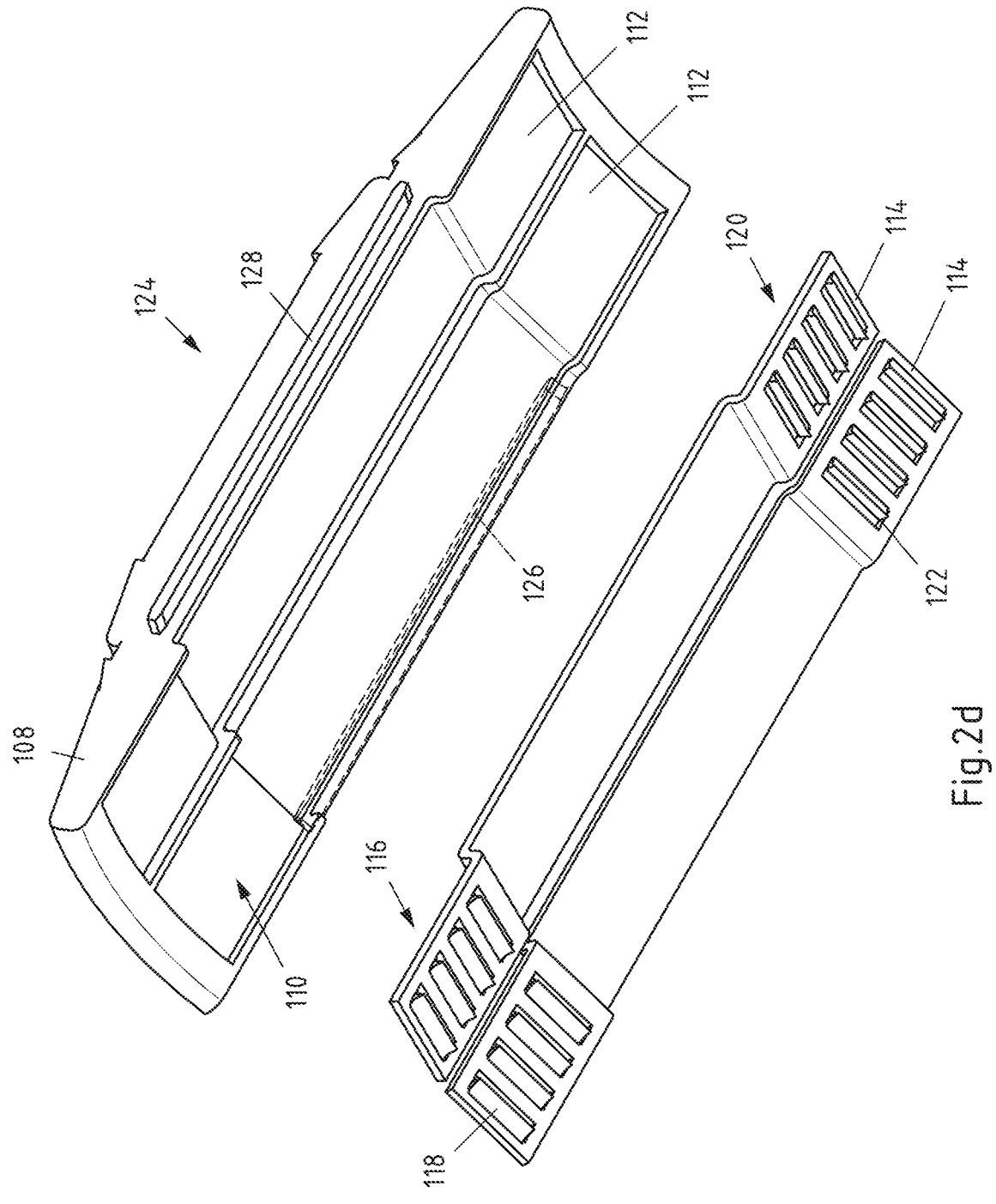
Figure 2E:
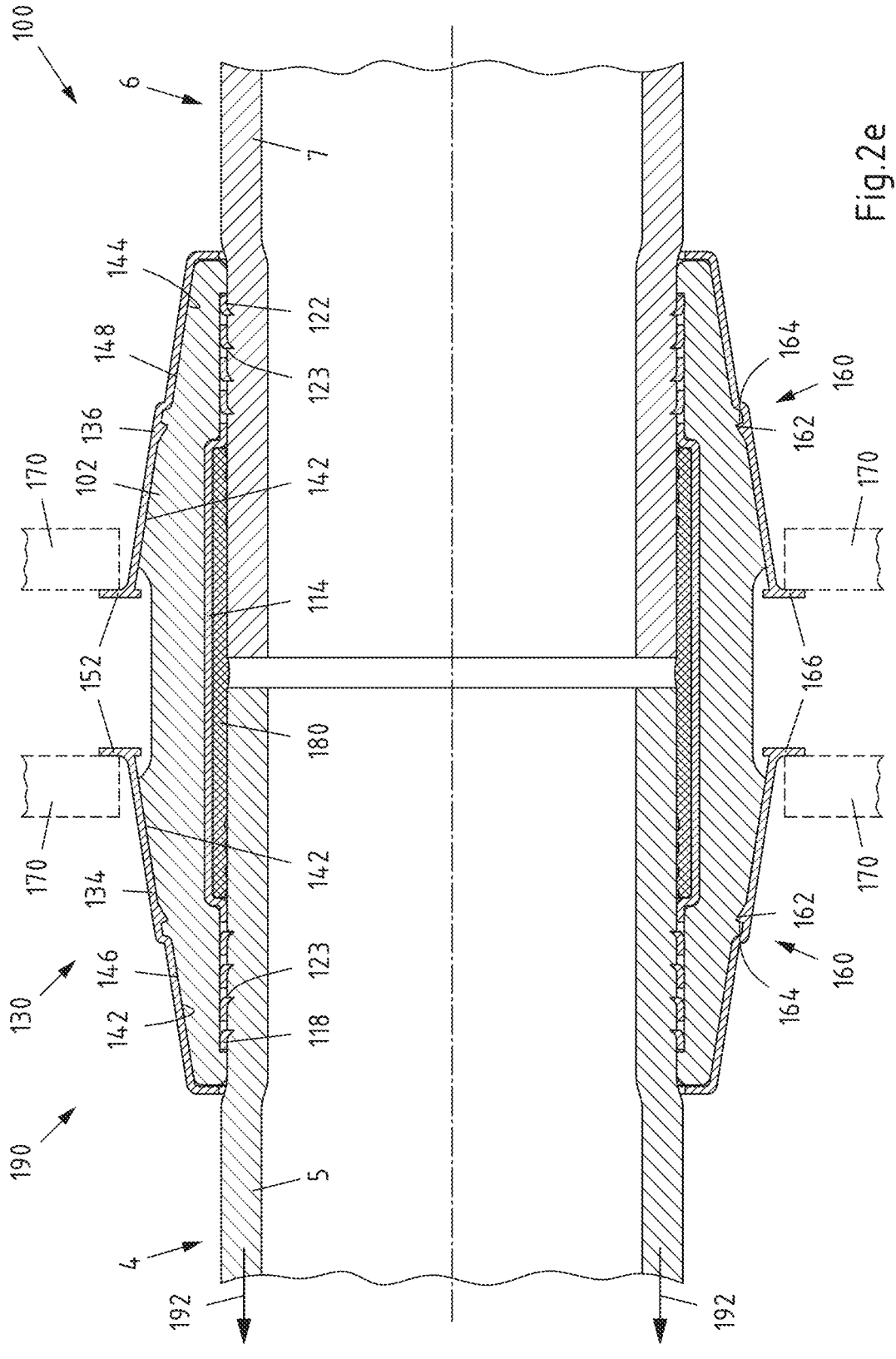

FIGS. 2a-e show a first exemplary embodiment of the pipe connector for tightly connecting a first pipe end to a second pipe end in various views, namely in the unpressed state (FIGS. 2a-d) and in the pressed state (FIG. 2e).

FIG. 2a shows a schematic sectional view of the pipe connector 100 in the unpressed state. FIG. 2b shows the view from FIG. 2a with pipe ends 4, 6 inserted into the pipe connector 100. FIG. 2c shows a schematic, perspective exploded view of the pipe connector 100. FIG. 2d shows a perspective detail view of a base body segment 108 and two bridge retaining elements 114. FIG. 2e shows the view from FIG. 2b in the pressed state.

The pipe connector 100 has a sleeve-like base body 102 made of plastic, which has a first receptacle 104 for inserting a first pipe end 4 of a first pipe 5 and a second receptacle 106 opposite the first receptacle 104 for inserting a second pipe end 6 of a second pipe 7.

The base body 102 is formed from several base body segments 108 of the same kind, in the present exemplary embodiment for example from eight base body segments 108, which are arranged next to one another in the circumferential direction.

FIG. 2d shows such a base body segment 108 in perspective view. The base body segment 108 has two receptacles 112 on the inner side 110 for a respective, preferably provided, bridge retaining element 114, which are also shown in FIG. 2d. Each of the bridge retaining elements 114 extends from the area of the first receptacle 104 to the area of the second receptacle 106 and forms first retaining elements 116 in the form of a plurality of cutting edges 118 in the area of the first receptacle 104 and second retaining elements 120 in the form of a plurality of cutting edges 122 in the area of the second receptacle 106. The bridge retaining elements 114 may, for example, be formed from metal or fiber-reinforced plastic and preferably have a higher tensile strength $R_m$ and/or a higher yield strength $R_{p0,2}$ than the base body segment 108 or the base body 102, respectively.

In the present case, the bridge retaining elements 114 are each formed in one piece and can transmit tensile forces acting on one of the retaining elements 116, 120 to the respective other retaining element 120, 116. The bridge retaining elements 114 thus extend from the area of the first receptacle 104 to the area of the second receptacle 106 in a tensile force transmitting manner.

The base body segments 108 have alignment means 124 on their mutually facing sides in the form of a respective groove 126 and a respective corresponding tongue 128, wherein the tongue 128 of a base body segment 108 engages in the groove 126 of an adjacent base body segment 108 and thus aligns their position relative to one another.

The pipe connector 100 further comprises a housing 130 consisting of two housing parts 134, 136 axially offset from one another, wherein the first housing part 134 surrounds the base body 102 in the area of the first receptacle 104 and the second housing part 136 surrounds the base body 102 in the area of the second receptacle 106 in the manner of a shell. The housing 130 may, for example, be made of metal or plastic, in particular fiber-reinforced plastic.

The housing parts 134, 136 are each formed in a sleeve-like manner with a respective housing opening 138, 140 for inserting a respective pipe end 4, 6 into the first or second receptacle 104, 106.

Furthermore, the housing parts 134, 136 have respective inclined, frustoconical sliding surfaces 142, 144, which correspond to respective inclined, frustoconical pressing surfaces 146, 148 on the outside of the base body 102.

Furthermore, the housing parts 134, 136 and the base body 102 have corresponding first latching means 150 in the form of latching hooks 152 and corresponding undercuts 154 in order to hold the housing parts 134, 136 in an initial position in the unpressed state (FIG. 2a). In this way, the housing parts 134, 136 are held captive on the base body 102 and the individual base body segments 108 of the base body 102 are held together.

In addition, the housing parts 134, 136 and the base body 102 have corresponding second latching means 160 in the form of latching hooks 162 and corresponding undercuts 164 in order to hold the housing parts 134, 136 in a pressed position in the pressed state (FIG. 2e).

The housing parts 134, 136 are also provided with respective attachments 166 for pressing jaws 170 of a pressing tool 172 (indicated by dashed lines in FIG. 2b).

The pipe connector 100 further comprises a sleeve-shaped sealing element 180, which extends between the first retaining elements 116 and the second retaining elements 120 of the bridge retaining elements 114 from the area of the first receptacle 104 to the area of the second receptacle 106 and is arranged, with respect to the base body 102, radially inside the bridge retaining elements 114. In the exploded view in FIG. 2c, the sealing element 180 is displaced axially out of the base body 102 for better visualization. In the area of the first receptacle 104 and in the area of the second receptacle 106, the sealing element 180 has inwardly directed sealing lips 182 for sealing against the outer surface of the corresponding pipe end 4, 6 in the pressed state.

The use of the pipe connector 100 for tightly connecting two pipe ends 4, 6 is described below.

In order to connect two pipe ends 4, 6 to each other with the pipe connector 100, the pipe ends 4, 6 are inserted through the respective housing opening 138, 140 into the respective receptacle 104, 106 of the pipe connector 100 as shown in FIG. 2b. The pressing jaws 170 of a pressing tool 172 are then applied to the attachments 166 of the housing parts 134, 136 of the pipe connector 100 as indicated in FIG. 2b.

The pressing jaws 170 of the pressing tool 170 can be moved axially towards each other (see arrows 176 in FIG. 2b) mechanically or also hydraulically by means of a pressing jaw actuator (see reference sign 374 in FIG. 4) of the pressing tool 170, so that the two housing parts 134, 136 are moved towards each other. During this movement, the inclined sliding surfaces 142, 144 slide over the corresponding pressing surfaces 146, 148 of the base body 102, whereby the axial pressing forces exerted by the pressing jaws 170 on the housing parts 134, 136 are partially redirected into radial pressing forces on the base body 102, whereby the latter is pressed in the radial direction.

When the base body 102 is pressed, the base body segments 108 are cold-formed, whereby any gaps between the individual base body segments 108 in the unpressed state close and the base body is deformed radially inwards, whereby the cutting edges 118, 122 of the bridge retaining elements 114 are embedded into the outer surface of the pipe ends 4, 6 and thus fixate them positively in the respective receptacle 104, 106.

The segmented base body 102 and the gaps preferably provided between the individual base body segments 108 facilitate the pressing of the base body 102 and require a lower pressing force, which is particularly advantageous for larger wall thicknesses of the base body 102 or larger nominal widths.

The cutting edges 118, 122 of the bridge retaining elements 114 are asymmetrical with a steeper angle of the cutting surface 123 facing the center of the pipe connector 100 to increase the pull-out force that would be required to pull the pipe ends 4, 6 out of the receptacles 104, 106.

Furthermore, the sealing element 180 is pressed with the sealing lips 182 against the outer surface of the pipe ends 4, 6 and seals the connection between the pipe ends gas-tight and/or liquid-tight.

At the end of the pressing process, the latching hooks 162 of the housing parts 134, 136 latch into the corresponding undercuts 164 of the base body 102, so that the housing parts 134, 136 are fixed in the pressed position and prevent the base body 102 from being deformed back from the pressed state.

The pressed state of the pipe connector 100 is shown in FIG. 2e.

The finally pressed pipe connector 100 ensures a durable and tight pipe connection 190 of the two pipe ends 4, 6. In particular, a more uniform pressing over the circumference can be achieved due to the segmented base body 102, so that potential weak points due to uneven pressing or cold forming in the circumferential direction are avoided as far as possible.

In particular, the preferably provided bridge retaining elements 114 further ensure a durable and tight pipe connection 190 of the two pipe ends 4, 6 even when axial forces act on the pipe connection. If, for example, an axial force (arrow 192) acts on the first pipe end 4, for example due to assembly work in the further course of the pipe or sudden media pressure surges during operation, this axial force is introduced into the bridge retaining elements 114 via the first retaining elements 116 and transmitted to the second pipe end 6 via the second retaining elements 120. In this way, the axial force is prevented from weakening the pipe connection 190 or causing it to leak. Since the axial forces that occur are transmitted via the bridge retaining elements 114, the wall thickness of the base body 102 can be reduced (for example compared to the pipe connector 10), which saves material and weight and makes it possible to provide a more compact press connector 100 overall.

Figure 3A:
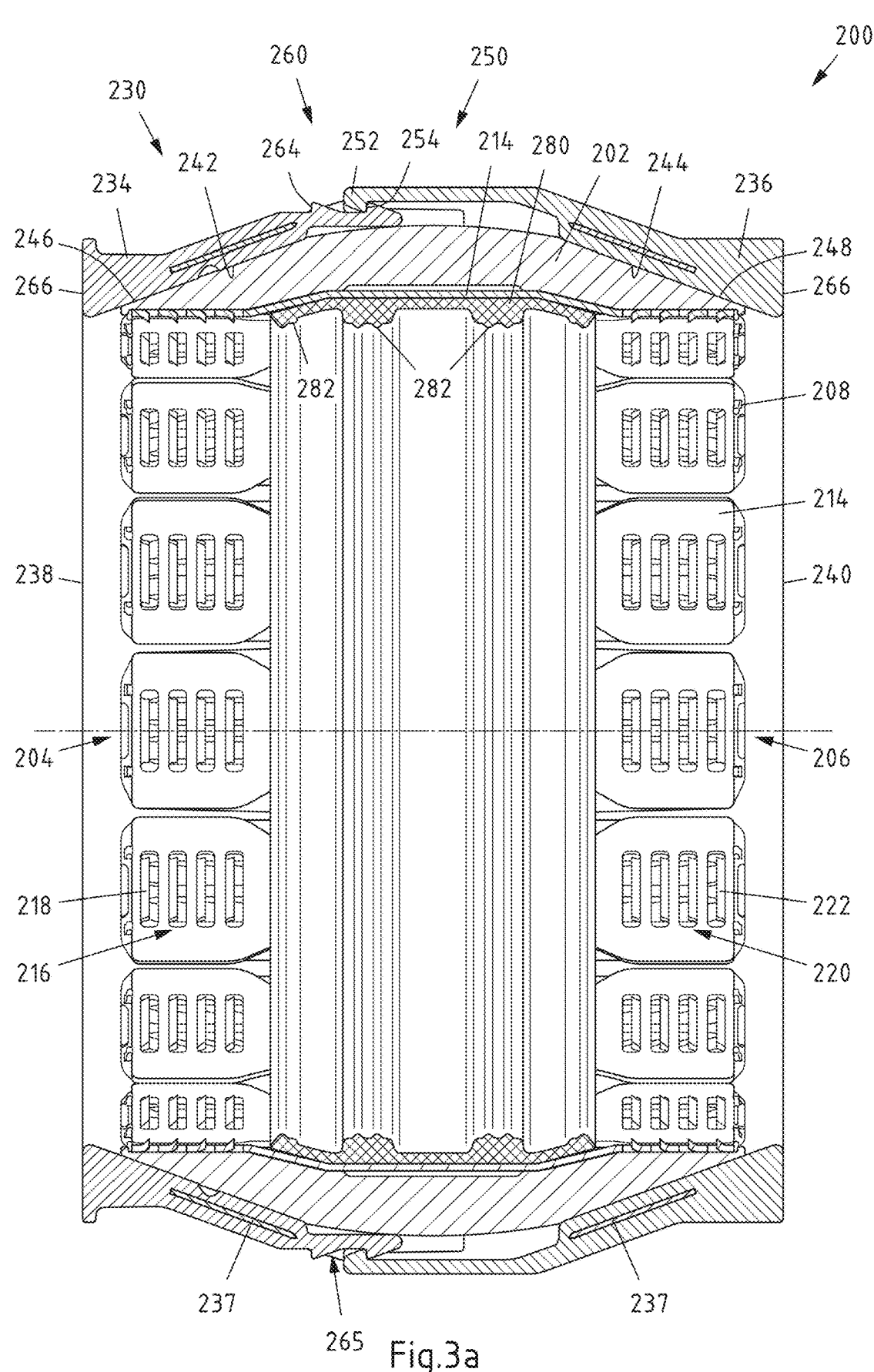
FIG. 3*a-e* show a second exemplary embodiment of the pipe connector in various views and its use.
Figure 3B:
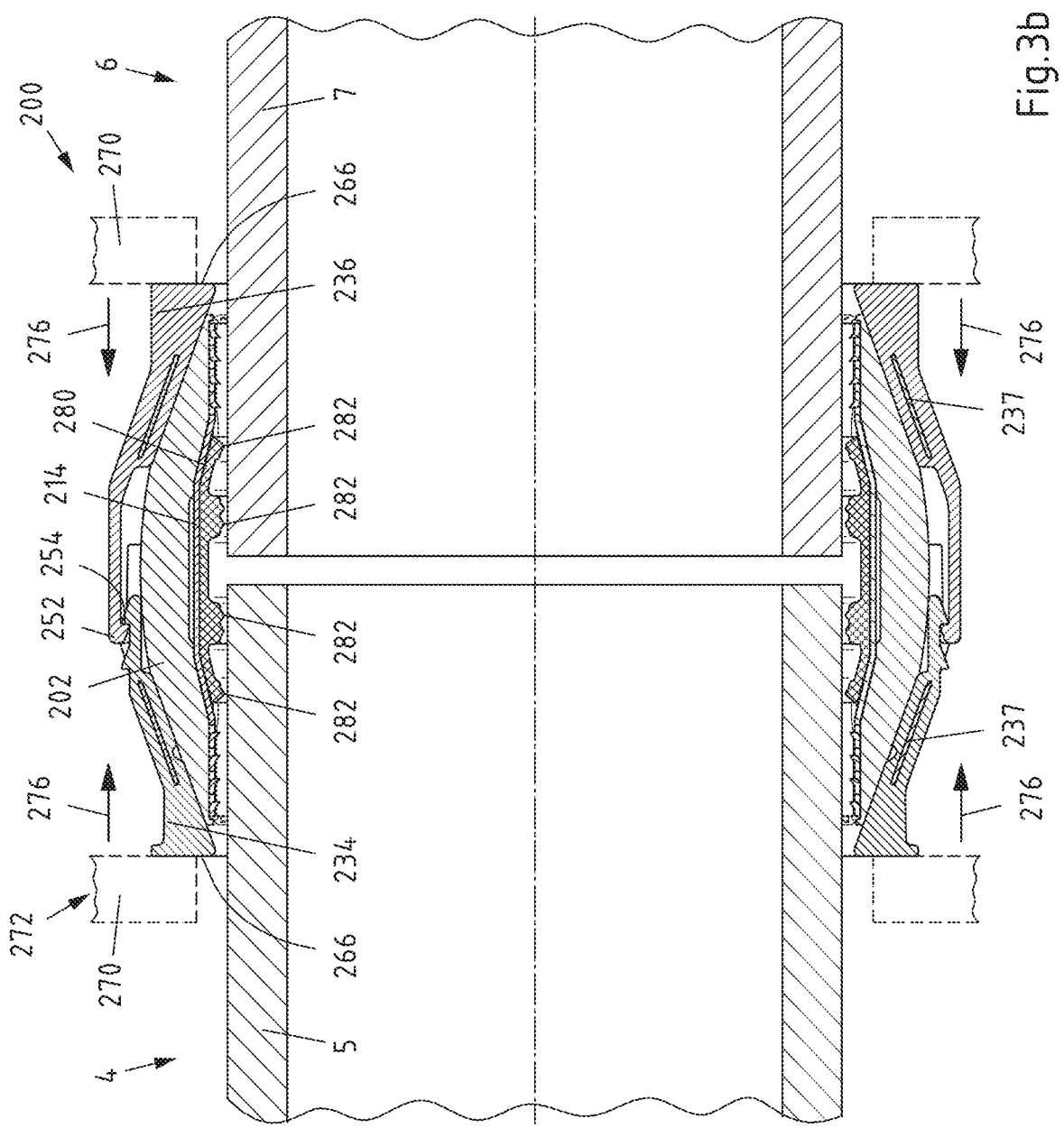
Figure 3C:
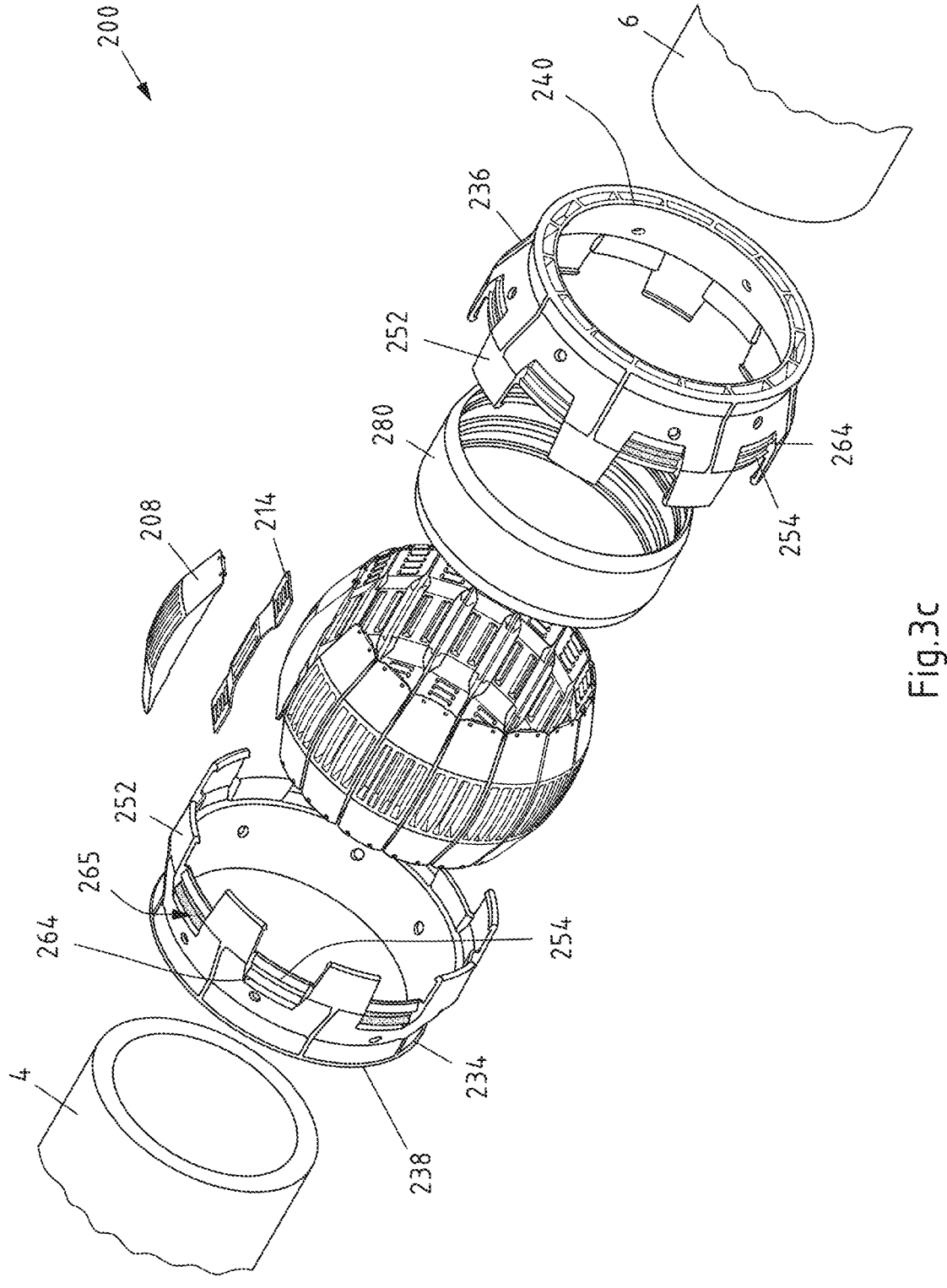
Figure 3D:
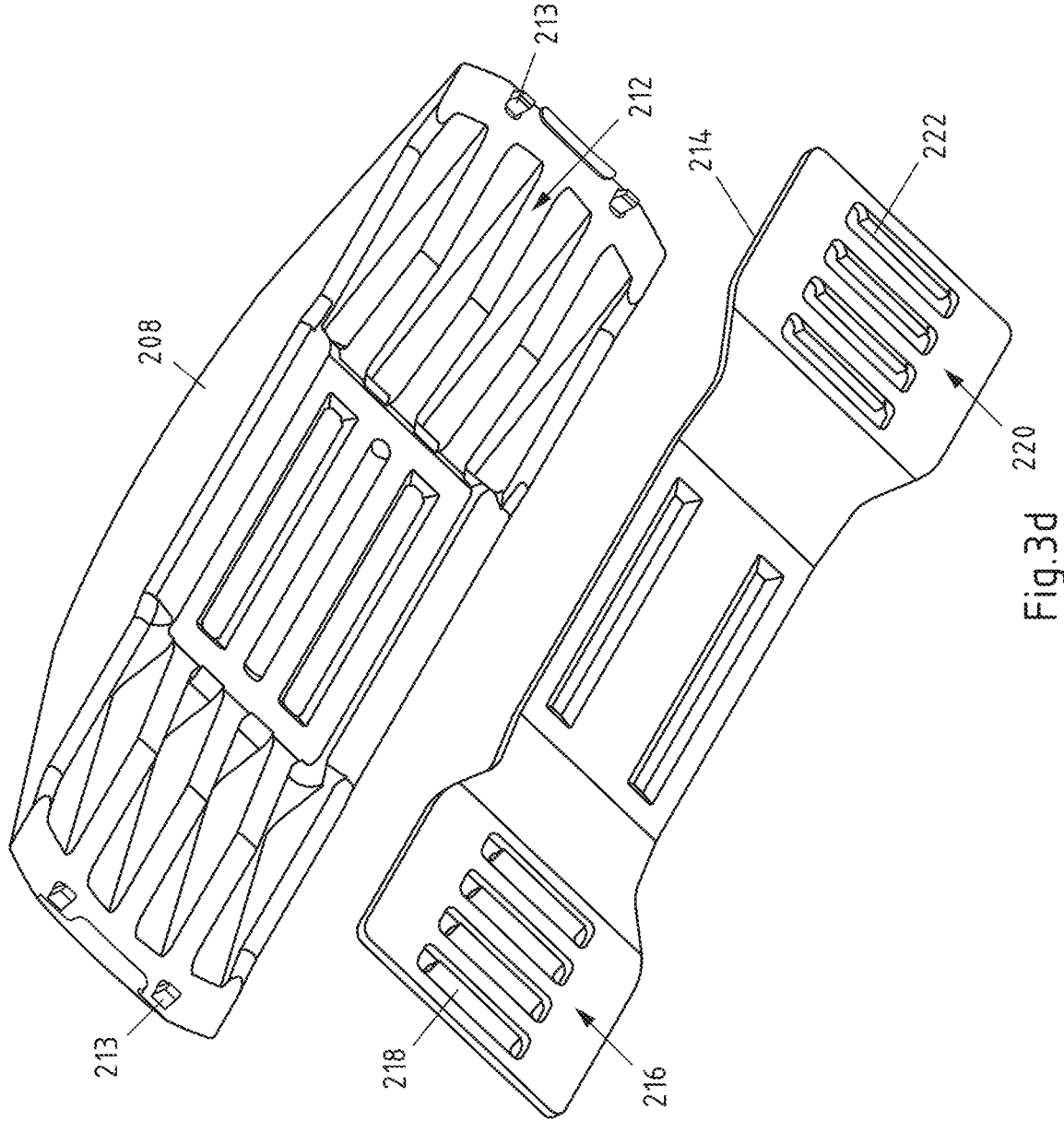
Figure 3E:
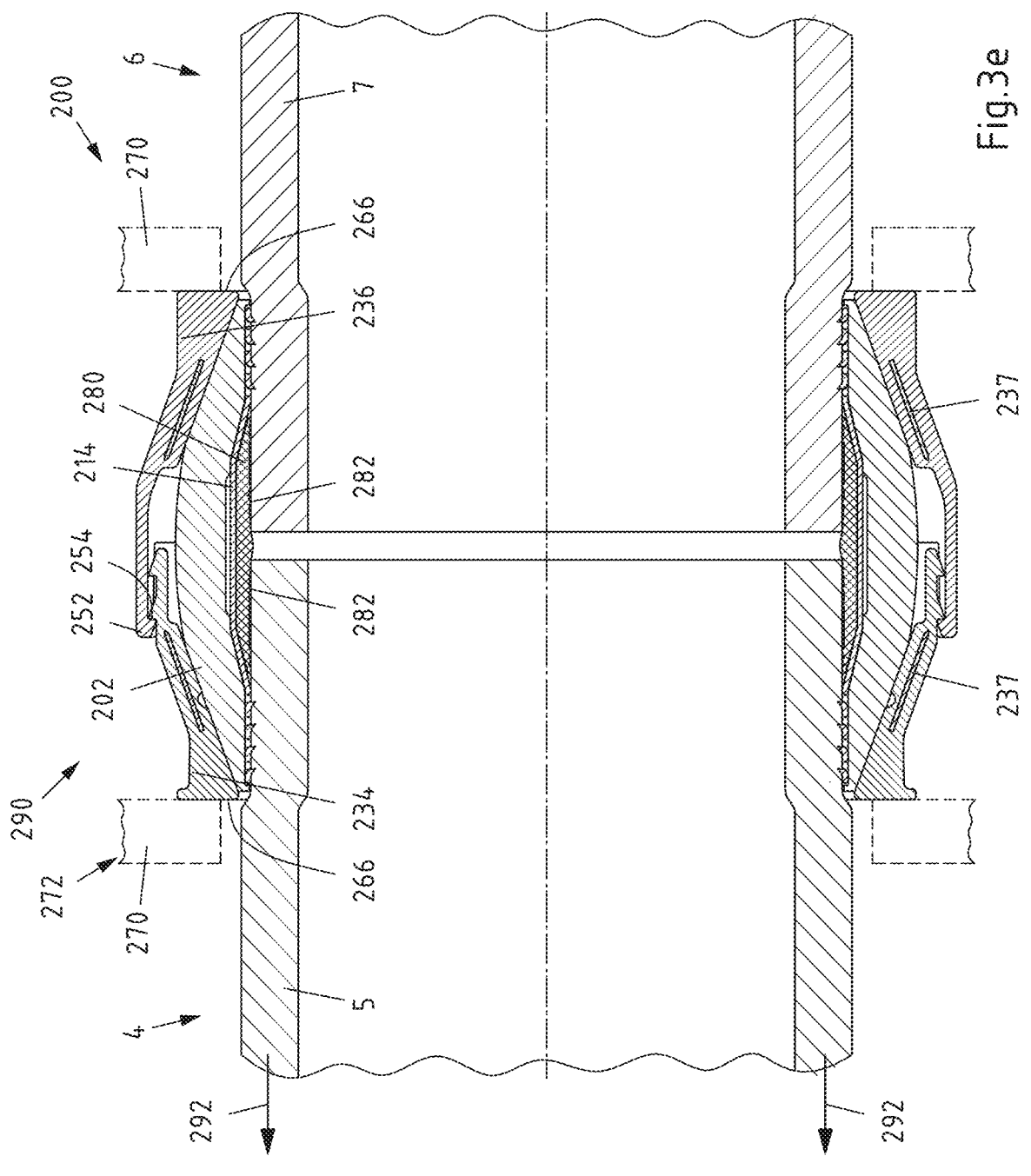

FIGS. 3a-e show a second exemplary embodiment of the pipe connector for tightly connecting a first pipe end to a second pipe end in various views, namely in the unpressed state (FIGS. 3a-d) and in the pressed state (FIG. 3e).

FIG. 3a shows a schematic sectional view of the pipe connector 200 in the unpressed state. FIG. 3b shows the view from FIG. 3a with pipe ends 4, 6 inserted into the pipe connector 200. FIG. 3c shows a schematic, perspective exploded view of the pipe connector 200. FIG. 3d shows a perspective detail view of a base body segment 208 and a bridge retaining element 214 of the pipe connector 200. FIG. 3e shows the view from FIG. 3b in the pressed state.

The pipe connector 200 basically has a similar structure to the pipe connector 100.

In particular, the pipe connector 200 also comprises a sleeve-like base body 202, which is formed from a plurality of base body segments 208, in the present example twelve base body segments 208, and has a first receptacle 204 for a first pipe end 4 and an opposite second receptacle 206 for a second pipe end 6. The base body segments 208 each have a receptacle 212 with latching hooks 213 on the inside, into which a bridge retaining element 214 is preferably inserted in each case and is fixated by the latching hooks 213. The bridge retaining elements 214 each extend from the area of the first receptacle 204 to the area of the second receptacle 206 and have first and second retaining elements 216, 220 in the form of cutting edges 218, 222 provided on the bridge retaining element 214.

The pipe connector 200 further has a housing 230 with two axially offset, sleeve-shaped housing parts 234, 236, which surround the base body 202 in the area of the first receptacle 204 and the second receptacle 206 respectively and have respective housing openings 238, 240 for inserting a pipe end 4, 6 into the receptacles 204, 206. The housing parts 234, 236 are made of plastic with a respective insert 237 made of metal for reinforcement.

The housing parts 234, 236 each have inclined sliding surfaces 242, 244 in the form of conical segments, which correspond to respective inclined pressing surfaces 246, 248 in the form of conical segments on the outside of the base body 202. Furthermore, the housing parts 234, 236 have corresponding first latching means 250 in the form of latching hooks 252 and corresponding undercuts 254 in order to hold the housing parts 234, 236 in an initial position in the unpressed state (FIG. 3a). Furthermore, the housing parts 234, 236 have corresponding second latching means 260 in the form of the latching hooks 252 and further corresponding undercuts 264 in order to hold the housing parts 234, 236 in a pressed position in the pressed state (FIG. 3e). Furthermore, the housing parts 234, 236 have respective attachments 266 for pressing jaws 270 of a pressing tool 272 (indicated by dashed lines in FIG. 2b).

The pipe connector 200 further comprises a sealing element 280 extending between the retaining elements 216, 220 of the bridge retaining elements 214 and radially, which is arranged radially further inwards than the bridge retaining elements 214 and comprises sealing lips 282 in the area of the first and second receptacles 204, 206.

The pressing process is similar to the pipe connector 100. After inserting the pipe ends 4, 6 into the receptacles 204, 206, an axial pressing force (arrows 276) is exerted on the housing parts 234, 236 by the pressing jaws 270 of the pressing tool 272, so that they are moved towards each other. Due to the interaction of the sliding surfaces 242, 244 with the pressing surfaces 246, 248, the axial pressing force is partially diverted into a radial pressing force on the base body 202, so that the base body segments 208 are cold formed, whereby any gaps between the individual base body segments 208 in the unpressed state close and the base body 202 is deformed radially inwards, whereby the cutting edges 218, 222 of the bridge retaining elements 214 are embedded into the outer surfaces of the pipe ends 4, 6 and thus fixate them in the respective receptacle 204, 206. The sealing lips 282 of the sealing element 280 pressed against the outer surfaces of the pipe ends 4, 6 during the pressing process seal the connection of the pipe ends 4, 6. At the end of the pressing process, the latching hooks 252 engage behind the undercuts 264 and fixate the housing parts 234, 236 in the pressed position.

A pressed marking 265 may be provided, which indicates the pressed state of the housing parts 234, 236. In this way, it is possible to check that the pressed position has been reached. For example, the housing part 234 may be provided with a colored marking as a pressed marking 265 in the area of the pressing means 250, 260 between the undercuts 254 and 264, which, in the unpressed position shown in FIG. 3a, is visible from the outside and, in the pressed position shown in FIG. 3e, is covered by the latching hooks 252 of the housing part 236 and is therefore not visible from the outside.

The finally pressed pipe connector 200 produces a durable and tight pipe connection 290 of the two pipe ends 4, 6. In particular, a more uniform pressing over the circumference can be achieved by the segmented base body 202, so that potential weak points due to uneven pressing or cold forming in the circumferential direction are avoided as far as possible.

In particular, the preferably provided bridge retaining elements 214 further ensure a durable and tight pipe connection 290 of the two pipe ends 4, 6 even when axial forces act on the pipe connection. For example, if an axial force (arrow 292) acts on the first pipe end 4, this axial force is introduced into the bridge retaining elements 214 via the first retaining elements 216 and transmitted to the second pipe end 6 via the second retaining elements 220. In this way, the axial force is prevented from weakening the pipe connection 290 or causing it to leak. Since the axial forces that occur are transmitted via the bridge retaining elements 214, the wall thickness of the base body 202 can be reduced (for example compared to the pipe connector 10), thereby saving material and weight and providing an overall more compact press connector 200.

Figure 4A:
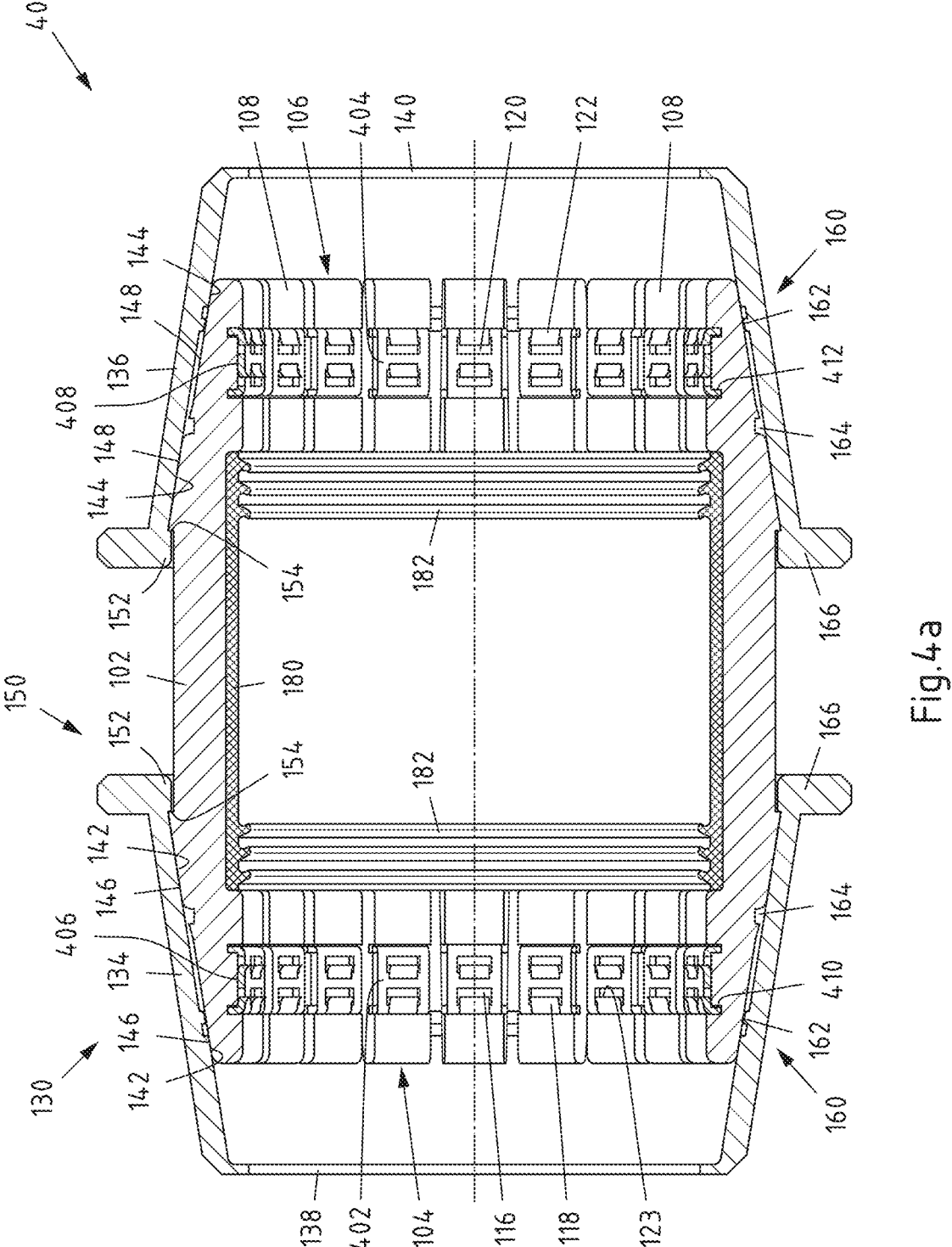
FIG. 4*a-c* show a third exemplary embodiment of the pipe connector and its use.
Figure 4B:
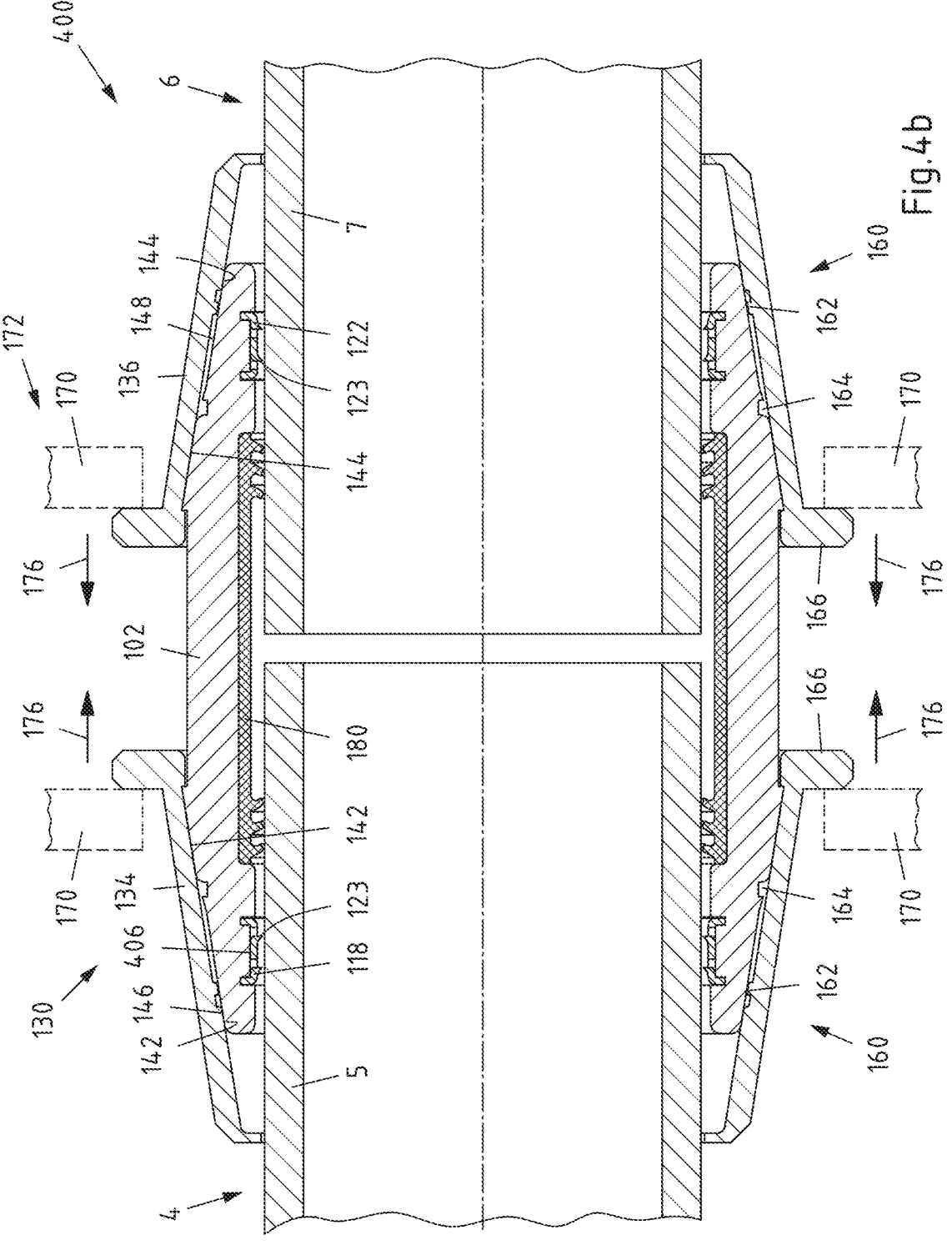
Figure 4C:
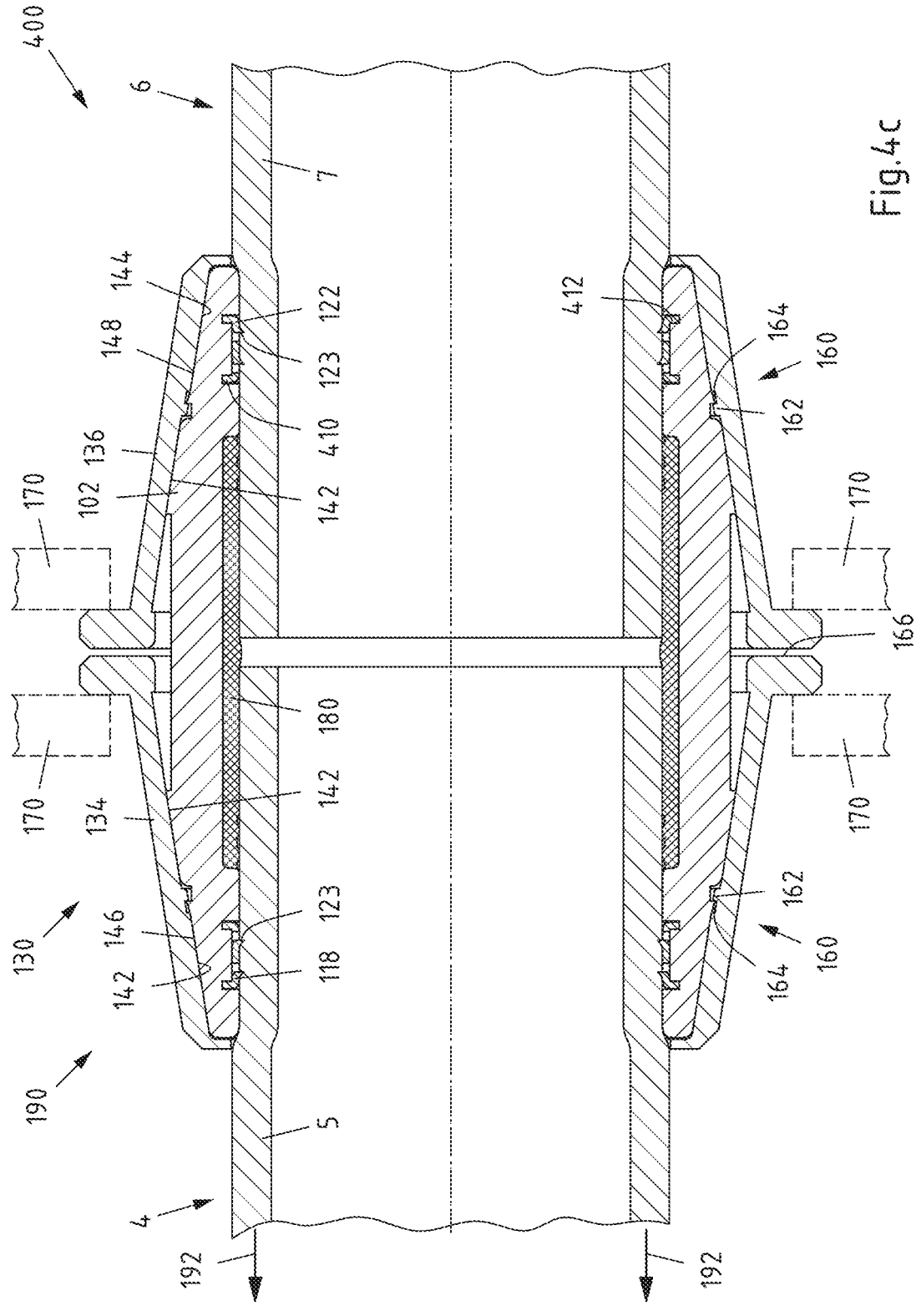

FIG. 4a-c shows a third exemplary embodiment of the pipe connector for tightly connecting a first pipe end to a second pipe end, namely in the unpressed state (FIG. 4a-b) and in the pressed state (FIG. 4c).

FIG. 4a shows a schematic sectional view of the pipe connector 400 in the unpressed state. FIG. 4b shows the view from FIG. 4a with the pipe ends 4, 6 inserted into the pipe connector 400. FIG. 4c shows the view from FIG. 4b in the pressed state.

The pipe connector 400 has a similar structure to the pipe connector 100 in FIG. 2a-e. Functionally corresponding parts are provided with the same reference numerals in FIG. 2a-e and FIG. 4a-c, even if they may differ geometrically from one another in detail. With regard to the function of these parts in the pipe connector 400, reference is made to the above description of FIGS. 2a-e.

As with the pipe connector 100, the base body 102 of the pipe connector 400 is also formed from a plurality of base body segments 108 arranged next to one another in the circumferential direction, in the present example from sixteen base body segments 108.

The pipe connector 400 differs from the pipe connector 100 in that the pipe connector 400 has no bridge retaining elements 114 and in that the first and second retaining elements 116, 120 in the form of cutting edges 118, 122 are instead arranged on two separate metal rings 402, 404. The metal rings 402, 404 engage positively in respective receptacles 406, 408 on the base body 102, so that the retaining elements 116, 120 are fixated to the pipe connector 400 in the axial direction of the latter. In order to achieve a more secure positive locking in the axial direction in the pressed state, the metal rings 402, 404 preferably have radially outwardly directed clamp elements 410, for example in the form of bent edge sections as in FIGS. 4a-c, which engage in corresponding recesses 412 in the receptacles 406, 408.

If, for example, axial tensile forces 192 act on the pipe end 4 in the pressed state, these are introduced into the base body 102 via the metal ring 402 and transmitted through this to the other pipe end 6 via the metal ring 404. In order to keep the component stresses in the base body 102 within an acceptable range when certain tensile stresses occur, the base body 102 may, for example, have a greater wall thickness or be formed from a stronger material. The segmented structure of the base body 102 with the base body segments 108 arranged next to one another ensures that the base body 102 can be pressed more easily and evenly over the circumference, even with a greater wall thickness or stronger material.

Figure 5:
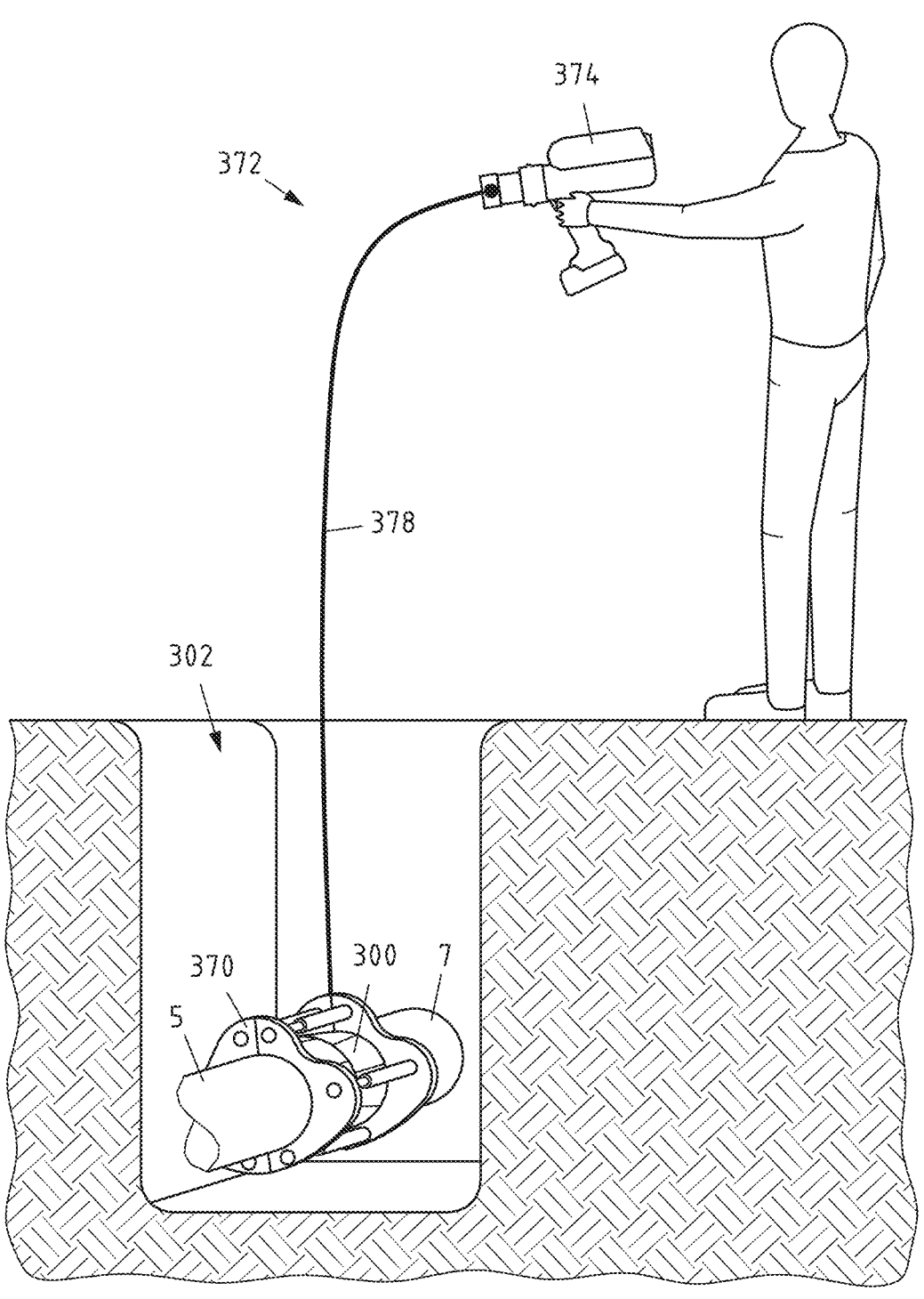
FIG. 5 shows an example of the use and of the method.

FIG. 5 shows an exemplary assembly situation when connecting the pipe ends 4, 6 of two buried pipes 5, 7 with a pipe connector 300, which may be designed, for example, like the pipe connector 100, like the pipe connector 200 or like the pipe connector 400, in a pit 302.

To produce the press connection, the pipe ends 4, 6 (analogous to FIGS. 2b and 3b) are inserted into the pipe connector 200 and the pressing jaws 370 of a pressing tool 372 (see pressing jaws 170 in FIG. 2b and pressing jaws 270 in FIG. 3b) are applied to the corresponding attachments (see attachments 166 in FIG. 2b and attachments 266 in FIG. 3b) of the pipe connector 200. A pressing force (see arrows 176 in FIGS. 1b and 2b) may be exerted on the pipe connector 200 via a pressing jaw actuator 374, which in FIG. 5 is connected to the pressing jaws 370 via a hydraulic line 378, in order to press the pipe connector 200. The hydraulic line 378 enables convenient actuation of the pressing jaw actuator 374 from outside the pit 302.

LIST OF REFERENCE SYMBOLS

4 first pipe end
5 first pipe
6 second pipe end
7 second pipe
10 pipe connector
12 base body
14 first receptacle
16 second receptacle
18, 20 retaining elements
22 cutting edge
23 metal ring
24 sealing element
26 sealing lips
100, 200, 300, 400 pipe connector
102, 202 base body
104, 204 first receptacle
106, 206 second receptacle
108, 208 base body segment
110 inner side
112, 212 receptacle for a bridge retaining element
114, 214 bridge retaining element
116, 216 first retaining element
118, 122, 218, 222 cutting edges
120, 220 second retaining element
123 cutting surface
124 alignment means
126 groove
128 tongue
130, 230 housing
134, 234 first housing part
136, 236 second housing part
138, 238 first housing opening
140, 240 second housing opening
142, 144, 242, 244 sliding surfaces
146, 148, 246, 248 pressing surfaces
150, 250 first latching means
152, 162, 252 latching hook

154, 164, 254, 264 undercuts
160, 260 second latching means
166, 266 attachments for pressing jaws
170, 270, 370 pressing jaws
172, 272, 372 pressing tool
176, 276 axial pressing force
180, 280 sealing element
182, 282 sealing lips
190, 290 pipe connection
192, 292 axial force
213 latching hook
237 insert
265 pressed marking
302 pit
374 pressing jaw actuator
378 line
402, 404 metal ring
406, 408 receptacle
410 clamp elements
412 recesses

The invention claimed is:

1. A pipe connector for tightly connecting a first pipe end to a second pipe end by pressing, the pipe connector comprising:

a base body, which has a first receptacle for inserting a first pipe end and a second receptacle for inserting a second pipe end, first retaining elements in an area of the first receptacle, which are designed to fixate a first pipe end inserted into the first receptacle in the first receptacle after the pipe connector has been pressed, and second retaining elements in an area of the second receptacle, which are designed to fixate a second pipe end inserted into the second receptacle in the second receptacle after the pipe connector has been pressed, wherein the base body is made of plastic, and wherein the base body is formed from at least four base body segments arranged next to one another in a circumferential direction.

2. The pipe connector according to claim 1, wherein one or more bridge retaining elements are provided, wherein a bridge retaining element extends in each case from the area of the first receptacle to the area of the second receptacle and forms at least one of the first retaining elements and at least one of the second retaining elements.

3. The pipe connector according to claim 2, wherein one or more of the base body segments have one or more receptacles for a respective bridge retaining element.

4. The pipe connector according to claim 2, wherein the one or more bridge retaining elements have a higher tensile strength and/or higher yield strength than the base body.

5. The pipe connector according to claim 2, wherein the one or more bridge retaining elements are formed in one piece.

6. The pipe connector according to claim 2, wherein the one or more bridge retaining elements have respective cutting edges as first and second retaining elements, wherein a cutting surface of the cutting edges pointing towards an axial center of the pipe connector has a steeper angle to an axial axis than the cutting surface pointing away from the axial center of the pipe connector.

7. The pipe connector according to claim 2, wherein the pipe connector has a sleeve-shaped sealing element which extends between the first retaining elements and the second retaining elements from the area of the first receptacle to the area of the second receptacle and is arranged further inwards in a radial direction of the base body than the one or more bridge retaining elements.

8. The pipe connector according to claim 1, wherein one or more of the base body segments have alignment means for aligning adjacent base body segments with respect to one another.

9. The pipe connector according to claim 1, wherein the pipe connector has a sleeve-shaped housing which at least partially surrounds the base body, the housing having a first housing opening for inserting a first pipe end into the first receptacle and a second housing opening for inserting a second pipe end into the second receptacle.

10. The pipe connector according to claim 9, wherein the housing has a plurality of housing parts which have sliding surfaces corresponding to respective pressing surfaces of the base body, so that an axial pressing force exerted on the housing parts by means of a pressing tool causes a radial pressing force on the base body.

11. The pipe connector according to claim 10, wherein the housing parts among each other and/or the housing parts and the base body have latching means corresponding to one another in order to latch the housing parts.

12. The pipe connector according to claim 10, wherein a pressed marking is provided which indicates the pressed state of the pipe connector on one of the housing parts in the area of the corresponding latching means.

13. The pipe connector according to claim 1, wherein at least one of the first pipe end and the second pipe end is made of a flexible material.

14. The pipe connector of claim 13, wherein the flexible material is plastic.

15. A method for tightly connecting a first pipe end to a second pipe end, in which a first pipe end is inserted into the first receptacle of a pipe connector according to claim 1, in which a second pipe end is inserted into the second receptacle of the pipe connector, and in which the pipe connector is pressed in such a way that the first pipe end is fixated in the first receptacle by the first retaining elements and the second pipe end is fixated in the second receptacle by the second retaining elements.

16. A method for tightly connecting a first pipe end to a second pipe end, in which a first pipe end is inserted into the first receptacle of a pipe connector according to claim 1, in which a second pipe end is inserted into the second receptacle of the pipe connector, and in which the pipe connector is pressed in such a way that the first pipe end is fixated in the first receptacle by the first retaining elements and the second pipe end is fixated in the second receptacle by the second retaining elements.

* * * * *